United States Patent [19]

Edelbruck et al.

[11] Patent Number: 4,596,331

[45] Date of Patent: Jun. 24, 1986

[54] SELF-CALIBRATING PRODUCTS SYSTEM AND METHOD

[75] Inventors: Pierre Edelbruck, Kingersheim; Georges Melzac, Illzach; Régis Marmonier, Kingersheim, all of France

[73] Assignee: Manufacture de Machines du Haut-Rhin, S.A., "MANURHIN", Mulhouse, France

[21] Appl. No.: 523,038

[22] Filed: Aug. 12, 1983

[30] Foreign Application Priority Data

Aug. 12, 1982 [FR] France ............................... 82 14046

[51] Int. Cl.⁴ ......................... B07C 5/00; G05B 23/02

[52] U.S. Cl. ................................... 209/546; 209/551; 364/552; 364/579

[58] Field of Search ............... 209/546, 548, 551, 600, 209/601, 604, 914, 919, 928; 364/550, 551, 552, 562, 571, 579, 580

[56] References Cited

U.S. PATENT DOCUMENTS

| | | | |
|---|---|---|---|
| 2,356,236 | 8/1944 | Gagne, Jr. | 209/548 |
| 3,082,871 | 3/1963 | Duncan | 209/548 |
| 3,417,476 | 12/1968 | Martens | 209/604 X |
| 3,863,349 | 2/1975 | Wilson | 209/601 X |
| 3,895,356 | 7/1975 | Kraus | 364/580 X |
| 3,946,212 | 3/1976 | Nakao et al. | 364/552 |
| 4,117,539 | 9/1978 | Bell et al. | 364/551 |
| 4,331,026 | 5/1982 | Howard et al. | 364/571 X |
| 4,454,947 | 6/1984 | Jacobsmeyer et al. | 209/548 |

OTHER PUBLICATIONS

*Automatic Cartridge Case Inspection and Process Control Monitor,* W. J. Coleman and K. L. Swinth, SPIE vol. 122, Advances in Laser Engineering (1977), pp. 33–44.

*Primary Examiner*—David A. Scherbel
*Assistant Examiner*—Edward M. Wacyra

[57] ABSTRACT

An installation for assembly-line manufacture in which workpieces move in a row along a production path at a generally uniform spacing. A feed unit holds a supply of workpieces and places them one at a time in a predetermined position in the seats of an input rotary feed conveyor. An inspecting unit defines a portion of the continuous production path for the workpieces and inspects the workpieces as they pass therealong. The inspecting unit itself includes an intake rotary conveyor cooperating with the feed conveyor, an output rotary conveyor, and at least one inspecting carousel between the intake and output conveyors. A controller supervises and coordinates the operation of the other units on the workpieces as same move along the production path. A calibrating unit serves to periodically create gaps in the production line upstream of the inspecting carousel, insert a minimum-size gage piece into one of the gaps and a maximum-size gage piece into another gap at a location upstream of the inspecting carousel, measuring the sizes of the gage pieces on the inspecting carousel, and establishing from the measured sizes of the gage pieces, new maximum- and minimum-size limits. A rejecting unit along the production path downstream of the inspecting carousel removes from the path workpieces whose sizes lie outside the range of the size limits established based on the gage-piece sizes.

9 Claims, 18 Drawing Figures

SELF-CALIBRATING PRODUCTS SYSTEM AND METHOD

FIELD OF THE INVENTION

The present invention relates to a mass-production system. More particularly this invention concerns a method of calibrating such a system.

BACKGROUND OF THE INVENTION

In mass production the workpieces, for instance small-arms ammunition, are arranged in a single row by rotary conveyors, formed with spaced seats, adjacent to working stations set up to act sequentially on the workpieces. As is known, a rotary conveyor takes a workpiece into one of its seats at a location along its periphery and transfers it, at another location, to another such rotary conveyor or to a working station. In addition a workpiece can move from a working station to a rotary conveyor to go toward another working station or to a receptacle. The essential advantage of mass production is to increase the production rate while reducing costs. Nonetheless the continuous movement of the workpieces poses delicate timing and testing problems.

OBJECT OF THE INVENTION

It is therefore an object of the present invention to provide an improved production system.

Another object is the provision of such a production system which operates very accurately, and which can even calibrate itself.

A further object is to provide a system with exact physical and temporal spacing between adjacent workpieces as well as accurate inspection of them in a mass-production manufacturing operation.

SUMMARY OF THE INVENTION

In an installation for assembly-line manufacture according to the invention, workpieces move in a row along a production path at a generally uniform spacing. A feed means or unit holds a supply of workpieces and places then one at a time in a predetermined position in the seats of an input rotary feed conveyor. An inspecting means or unit defines a portion of the continuous production path for the workpieces and inspects the workpieces as they pass therealong. The inspecting unit itself includes an intake rotary conveyor cooperating with the feed conveyor, an output rotary conveyor, and at least one inspecting carousel between the intake and output conveyors. A controller supervises and coordinates the operation of the other means or units on the workpieces as same move along the production path. A calibrating means or unit serves to periodically create gaps in the production line of workpieces upstream of the inspecting carousel and to insert a minimum-size gage piece into one of the gaps and a maximum-size gage piece into another gap at a location upstream of the inspection carousel, the inspecting carousel then measuring the sizes of the gage pieces on the inspecting carousel, and establishing, from the measured sizes of the gage pieces, maximum- and minimum-size limits. A rejecting means or unit along the production path downstream of the inspecting carousel removes from the production path, workpieces whose sizes lie outside the range of the size limits established based on the gage-piece sizes.

Thus the calibrating method according to this invention includes the steps of periodically creating at least two gaps in the production line of workpieces upstream of the inspecting carousel, inserting a minimum-size gage piece into one of the gaps and a maximum-size gage piece into the other gap upstream of the inspecting carousel, measuring the sizes of the gage pieces on the inspecting carousel, and establishing, from the measured sizes of the gage pieces, new maximum- and minimum-size limits. Thus during a subsequent production run the new limits are used to establish the acceptable non-reject range.

According to another feature of the invention, the inspecting carousel and the intake and output conveyors each have a plurality of workpiece-receiving seats equispaced about a center. The calibrating unit includes recycling means, including a recycling conveyor, connected between the intake and output conveyors, for taking the gage pieces from the latter and circulating them back to the former. Thus the conveyors and inspecting carousel define a closed recycling circuit having a predetermined number of generally equispaced positions. According to a feature of this invention, the number of positions of the recycling circuit and the number of seats of the inspecting carousel having no common whole-number divisor other than one. In this manner after the gage pieces have circulated that number of times equal to the number of seats of the inspecting carousel, every seat thereof will have been recalibrated.

A working means or unit is provided, according to this invention, between the feed unit and the inspecting carousel. This working unit includes an upstream rotary conveyor for receiving workpieces from the input feed conveyor, a working carousel for receiving workpieces from the upstream rotary conveyor and including means for working on the workpieces, and a downstream rotary conveyor for receiving workpieces from the working carousel and passing them to the intake rotary conveyor of the inspecting unit.

The inspecting unit of this invention includes at least one measuring element displaceable, relative to the inspecting carousel, into and out of contact with the workpieces thereon and carrying a target jointly displaceable with the measuring element, and means, such as a Foucault-current sensor, for measuring the distance from the target to a fixed location when this measuring element is engaging a workpiece. A further target may be fixed to the inspecting carousel to allow verification of carousel position and a general check on operation.

Means are also provided for displaying the workpiece sizes, and can do so in any normal measurement system, while forming part of an input-output system having a control board allowing process control.

The controller or control unit itself is also connected to the calibrating and rejecting unit for controlling same. This control unit has a nonvolatile memory for the various limits, so that if shut down, the machine does not have to be recalibrated. In addition test pieces like the gage pieces can be introduced into the production line at any time to test it.

The control unit includes, for each other unit, a respective first-level logic unit and has also a second-level logic unit connected to the first-level units.

Thus the instant invention enables the performance of a complete calibration of the machine in one automatic operation, simply by using one minimum-size gage and one maximum-size gage. The number of measurements made may be greater than the number of sensors, as several such targets as described above can be employed to measure several different size ranges.

Once production is under way, the targets fixed on the carousel, as they are juxtaposed with the sensors, give readings that enable any drift of values, whether caused by electronic variations or mechanical and thermal problems, to be sensed and cancelled out.

In addition, it is possible at any time to insert into the production line of workpieces, test pieces, which just can be perfect workpieces, or to pull out and check a workpiece. At any time, the operator can check the production equipment and the workpiece size.

DESCRIPTION OF THE DRAWING

The above and other features and advantages will become more readily apparent from the following, reference being made to the accompanying drawing in which.

SPECIFIC DESCRIPTION

Mechanical Elements

Figure 1:
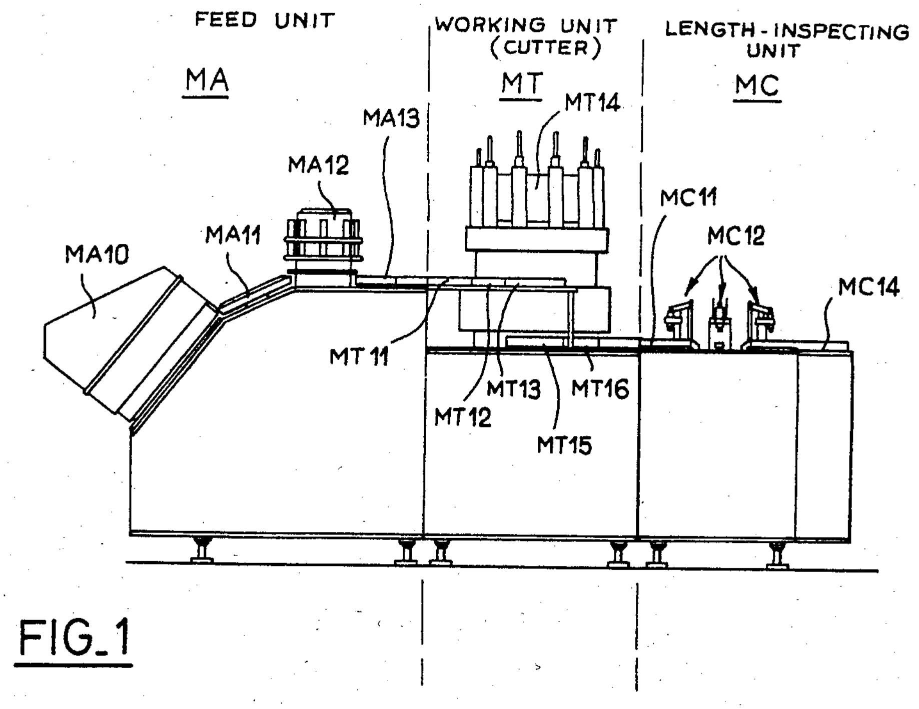
FIG. 1 is a largely schematic small-scale side view of the apparatus of this invention.
Figure 2:
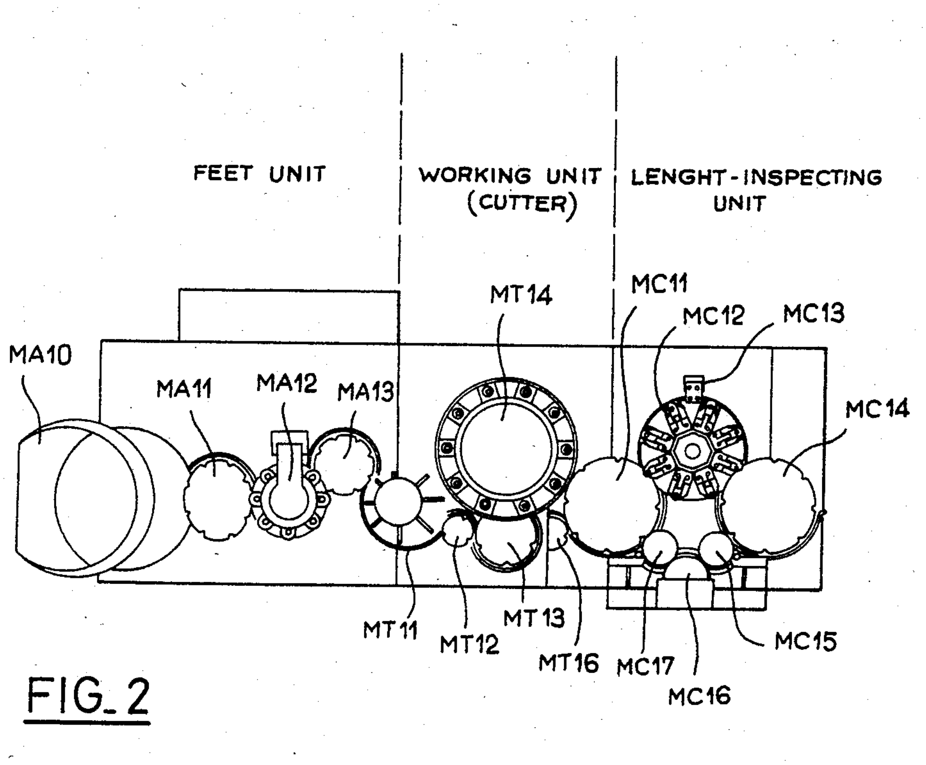
FIG. 2 is a top view of the apparatus of FIG. 1.

As seen in FIGS. 1 and 2, a mass-production installation has the following basic structures:

A feed unit or means MA holds, in a hopper MA10, a supply of workpieces (seen at 1200 in FIG. 4) to be machined, and places them in a predetermined position in an input rotary conveyor wheel MA 13. Between the supply hopper MA10 and the input rotary conveyor wheel MA13, there can be other transfer wheels MA11 or working wheels MA12. The wheel MA12 serves to verify that the workpiece, for example the empty cartridge casing, has been positioned right-side up, that is, with its mouth facing up.

At least one working unit MT forms another part of the working path of the production line of workpieces, between an upstream rotary-conveyor wheel MT11, cooperating with the input rotary conveyor wheel MA13, and a downstream rotary-conveyor wheel MT16. At least one working carousel MT14 is provided between the upstream and downstream rotary-conveyor wheels MT11 and MT16. This working carousel MT14 serves to perform at least one machining or manufacturing operation on the workpieces as they pass thereby. Other wheels MT12, MT13, and MT15 are used in the working unit MT to transfer the workpieces between its input and its output. Usually the working unit MT moves the workpieces vertically, as shown in particular in FIG. 1 where the wheels MT12 and MT13 are higher than the wheels MT15 and MT16.

Finally FIGS. 1 and 2 show an inspecting unit MC which also defines part of the production path of the workpieces between an intake rotary-conveyor wheel MC11 and an output rotary-conveyor wheel MC14. The wheel MC11 cooperates with the downstream wheel MT16 of the working unit MT. At least one inspecting carousel MC12 is provided between the intake wheel MC11 and the output wheel MC14 for a measuring operation relating to the abovementioned work that had been performed by the working carousel MT14. The inspecting carousel MC12 cooperates with a measuring means or sensor MC13 in a manner described below with reference to FIG. 4. Finally, according to a particular aspect of the invention, the inspecting unit MC has other wheels MC15, MC16, and MC17 which are provided between the output wheel MC14 and the intake wheel MC11.

In the preceding, the various rotary-conveyor wheels have been defined as to function, for example the feed wheel for the feed unit MA, upstream and downstream wheels for the working unit MT, and intake and output wheels for the inspecting unit MC. The person skilled in the art will understand that this terminology is only used to allow easy recognition of the various elements, since these wheels can be virtually identical.

By way of the example, the feed unit MA can be the type described in the following French patent publications Nos.: 2,346,072; 2,356,464; 2,379,335; or 2,376,049. Another patent of interest is French Pat. No. 2,463,081.

The device described in publication No. 2,379,335 allows selective ejection of the workpieces. This is particularly interesting for the invention as described below to create empty spaces or gaps in the succession of workpieces along the production path. Another way of making empty spaces is described in publication No. 2,459,296.

The working unit MT can, for example, be one of the machines described in French patent publication Nos. 2,333,412; 2,330,476; and 2,475,946. In the detailed description that follows, it is assumed that the machine incorporating the invention is for cutting tubular workpieces, such as cartridge casings, this simple operation being conducted by a machine such as seen in publication No. 2,333,412.

Specific Description of Inspecting Unit

Figure 3:
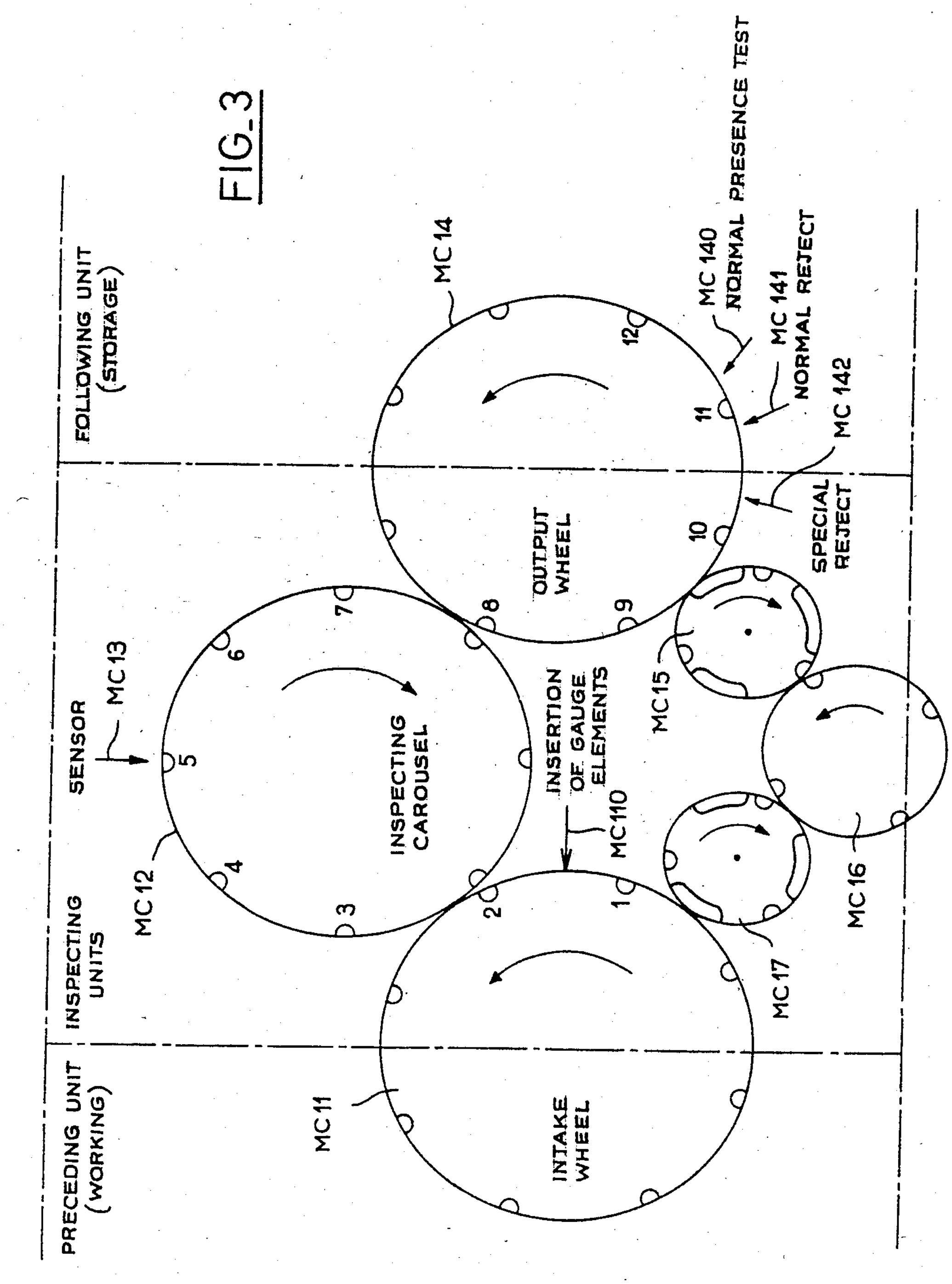
FIG. 3 is a large-scale schematic view of a detail of FIG. 2.

As best seen in FIG. 3, the inspecting unit MC includes the intake wheel MC11 followed by the inspecting carousel MC12, cooperating with the sensor MC13, and the output wheel MC14. The wheel MC11 thus takes the workpieces from a preceding unit, which is normally a working unit MT. These workpieces pass around the inspecting carousel MC12 which measures them at the sensor MC13. Finally the workpieces are taken back by the output wheel MC14 which either transfers them to a following unit (working or another inspecting unit) or puts them in storage. The output wheel MC14 has a normal-reject station MC141 which is preceded by a special-reject station MC142, the normal-reject station MC141 being followed by a presencedetecting station MC140 which verifies that the rejection operation has been carried out and which also assures that the workpieces to be transferred downstream have all been accepted. The reject devices can be of the type described in the above-cited publication No. 2,379,335.

Upstream of the stations MC140–MC142, the seats of the output wheel MC14 merge with those of a transfer wheel MC15 followed by another transfer wheel MC16 and then by a third transfer wheel MC17 which itself feeds the workpieces to the intake wheel MC11.

Thus in the inspecting unit MC there are wheels MC15–MC17 forming a recycling unit which can selectively send workpieces from the output wheel MC14 to the intake wheel MC11. For effective recycling, it is enough to provide deflectors between the wheels MC15 and MC14 and between the wheels MC11 and MC17.

Finally, the input wheel MC11 has a station MC110 for the insertion of standard-size pieces or gage pieces. This can be done, for example, by means of a chute extending tangentially above the path of the seats and allowing a gage piece to slide down into one of the seats.

Measuring Unit

Figure 4:
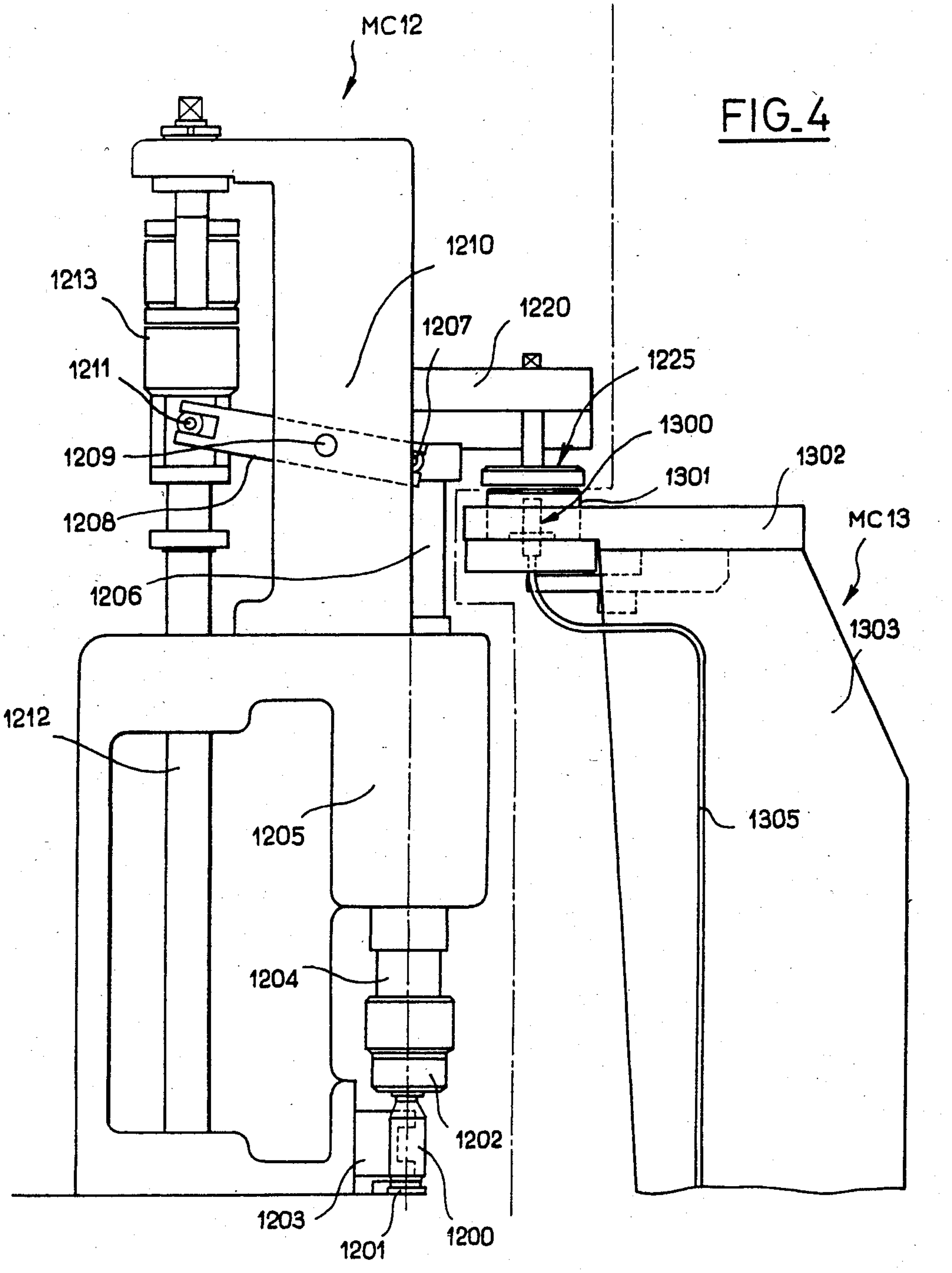
FIG. 4 is a large-scale end view of a detail of FIG. 1.

With reference to FIG. 4, the measuring unit MC13 is juxtaposed with one location along the inspection carousel MC12, only one of whose seats being shown. The illustrated seat is juxtaposed with the measuring unit MC13.

Each seat of the carousel MC12 has a cast-iron support with parts 1205 and 1210 positioned on the body of the carousel, seen at the bottom. The part 1205 is provided with a vertically through-bore through which a cylindrical releasing sleeve 1204 slidably fits. This sleeve 1204 is provided with an end 1202 which presses a workpiece, here a cartridge casing 1200, against a support member 1201. Transversely, the casing 1200 is gripped by jaws 1203. The sliding part 1204 has an upper part 1206 and is provided thereat with a coupling pin 1207 for engaging a link 1208 pivotally mounted at 1209 on the frame 1210. The other end of the link 1208 pivots on the pin 1211 of an assembly 1212 and 1213 which form a means for urging the left part of the link 1208 upward. During rotation of the carousel MC12 an unillustrated cam is effective to urge the elements 1204–1206 downward, thereby vertically compressing the casing 1200 to enable the measuring of its height after a cutting operation already mentioned which had taken place just upstream of the measuring station MC13.

The part 1206 is provided, on its upper end, with a stirrup 1220 on which is fixed a target 1225, formed as a steel disk with accurately parallel faces.

The measuring station MC13 includes a frame 1303, fixed relative to the inspecting unit MC, the upper part of which supports a measuring device 1301 comprising a cylindrical cage of a shape comparable to the periphery of the target 1225. This cage is provided internally with a sensor 1300 which measures the distance between itself and the target 1225. The sensor 1300 is connected by a line 1305 to the rest of the equipment.

The position of the target 1225 is determined by the vertical position of the part 1204 which, in turn, is determined by the height of the casing 1200 whose lower end is sitting on the support of the carousel MC12 which itself does not move vertically as it rotates relative to the measuring station MC13.

In a preferred embodiment, the sensor 1300 may be a Foucault-current detector such as the sensor commercially available from Vibro-Meter under the tradename Vibrax TQ102. This sensor 1300 is connected by the cable 1305 to a treatment system which can be of the type sold by the same company under the trade designation IQS603.

In this manner the sensor 1300 measures the distance between itself and the target 1225.

A major problem is to take into account the different vertical components in the rotary movement of the carousel MC12 as well as the variations of same and drifts that can affect the mechanical dimensions principally as a function of temperature and other factors.

For this, the instant invention provides a combination of means of which certain have already been described.

In addition, there is provided, on the inspecting carousel MC12 for each measurement, at least one or preferably two unillustrated fixed targets. These targets are mounted like the target 1225 but on the support 1210 which is fixed on the carousel MC12.

Figure 5:
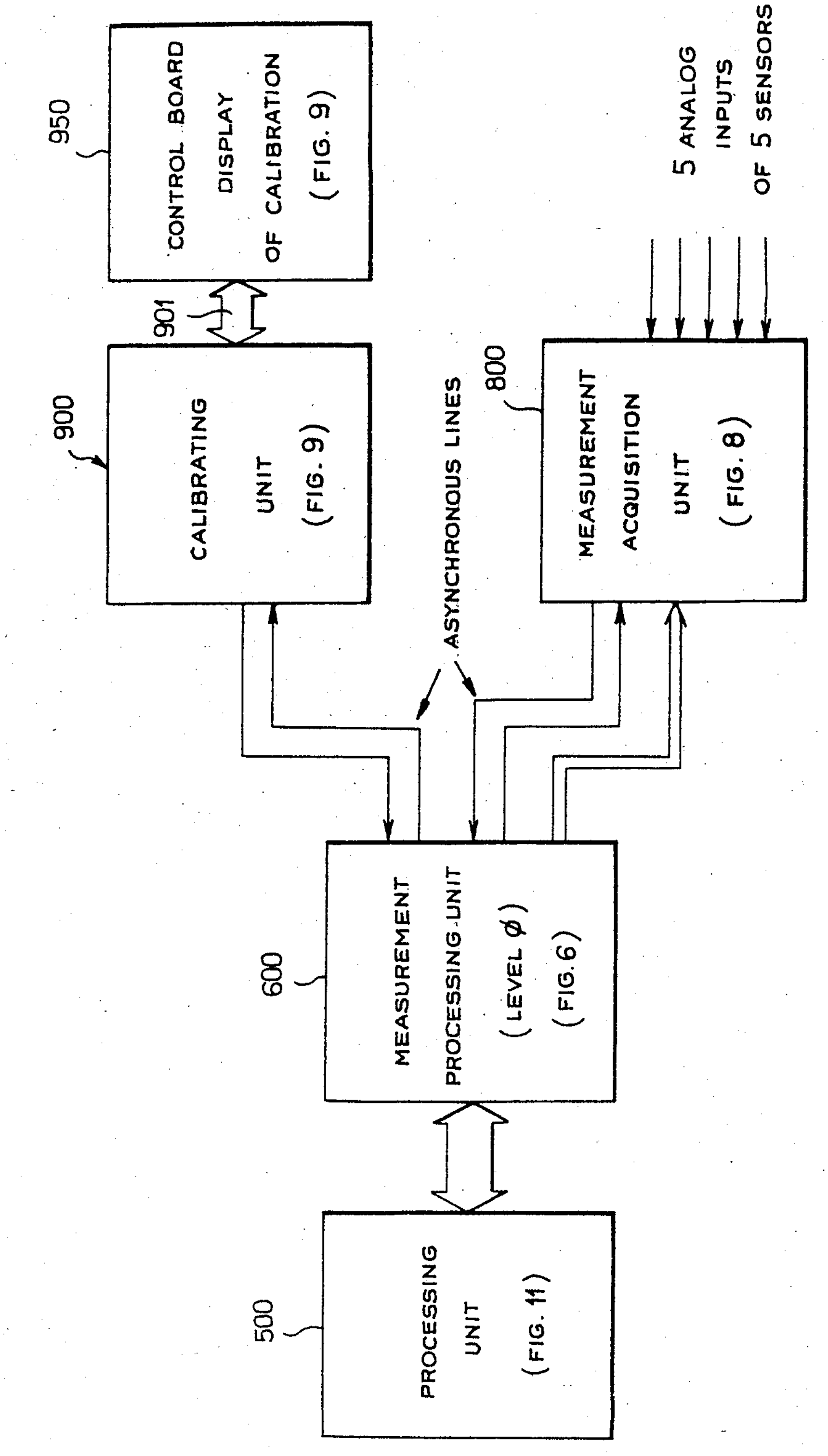
FIG. 5 is a block diagram illustrating the electronic system of this invention and illustrating the interconnections between the details shown in the remaining drawing figures.

In addition, logic control elements, shown generally at 500 and 600 in FIG. 5, are provided with their complementary units 800, 900, and 950.

General Operation

As mentioned above, French patent publications Nos. 2,379,335 and 2,459,196 teach how to create empty spaces or gaps in the succession of workpieces leaving the feed unit MA or of one of the work units upstream of the measuring unit MC. The teachings of these French patent publications can be used, according, to the present invention, to create gaps in the production line of workpieces upstream of the inspecting unit MC. Assuming that these gaps are created at the feed unit MA, the affected element is the element 511 of FIG. 11 as will be seen below. A simple variant is to completely empty the feed unit MA and stop it if necessary.

The other operations affect mainly the inspecting unit MC. The following operation consists in inserting at least one short standard-size piece or gage piece and at least one tall standard-size piece or gage in two, preferably consecutive, gaps thus created either manually or automatically in the production line of workpieces.

Thereafter the sensor 1300 of FIG. 4 derives maximum and minimum measurements from these standard gage pieces as reject values. The acquisition of the measurements in question comprises their conveyance to the acquisition unit 800 which will be described below with reference to FIG. 5.

All this takes place in a measuring phase of the manufacturing process.

Subsequently in the production phase, those workpieces whose size does not fall between the minimum and maximum values are rejected at the output wheel MC14. This rejection is effected logically by the element 513 of FIG. 11 which monitors and operates the inspecting unit MC. Physically, the rejection is carried out at the normal-reject station MC141 of FIG. 3.

To carry out the process described immediately above, two gage pieces of accurate size are used which are positioned in successive seats of the carousel MC12 and which are successively measured, using the parts 1204 and 1206, stirrup 1220 and the target 1225, by the sensor 1300 in a single pass along the production line. This system can be sufficient in certain applications, but it has been observed that fluctuations can appear in the measurements between the different seats of the inspecting carousel MC12. This is particularly true when the value to be measured is transmitted by an apparatus of the type described in FIG. 4 and comprising a measurement device such as the target 1225.

In this case, it is advisable to use a recycling device of the type described in FIG. 3 providing that the number of seats on the measuring carousel MC12 and the number of positions in the cycling loop, in part formed by the wheels MC15–MC17, have no common divisor other than one. For example, the measuring carousel MC12 has eight positions while the recycling loop has thirteen. This recycling loop therefore passes over a portion of every rotary-conveyor wheel MC11, MC12, and MC14–MC17 seen in FIG. 3. Thus, the number of positions in the recycling circuit includes positions on the intake and output wheels MC11 and MC14 as well as on the inspecting wheel MC12 and on the recycling wheels MC15–MC17 between the locations where the measuring gage is picked up and let off.

Under these conditions the logic units 500 and 600 are set up to effect the following operations:

(a) During calibration, they introduce into the production run, a number of gaps which is greater than twice the product of the number of positions along the recycling loop and the number of seats on the working carousel. (In effect, a number of positions equal to this product would be sufficient for one calibration. Since a maximum-size standard piece and a minimum-size standard piece are used each time, it is preferable that the number of gaps be greater than twice the product of the two above-cited numbers.) Thus, the two calibrating gage pieces are placed consecutively in the two first gaps. Thereafter the unit 600 will get, via the elements that cooperate with it, the maximum and minimum dimensions of the two calibrating gage pieces as well as the reject values for each seat of the measurement carousel, each calibration piece changing position after having passed through the recycling loop. (This requires that the two numbers have no common divisor other than one.) Finally the calibrating pieces are manually or automatically removed, for example at the special-reject station MC142.

(b) Subsequently the electronic control system orders, at the output wheel, the rejection of workpieces whose size does not lie between the minimum and maximum reject sizes which were determined for the particular seat carrying the workpieces.

According to another preferred form of this invention, there are several pairs of calibrating gage pieces which are, respectively, maximum and minimum in each pair so that a pair of calibrating pieces corresponds, for example, to one value to measure.

Electronic Elements—Detailed Description

A detailed description of the electronic system is now given with reference to FIG. 5.

This system has, first of all, an exploiting logic system or processing unit, indicated generally at 500 and which will be described more in detail below with reference to FIG. 11. (In this FIG. 11 the elements of the device 500 are found inside the dot-dash box.)

The system comprises a numerical encoder connected to one or several incremental coders indicated generally at CO, and having the function of determining the machine position, allowing the detection of the presence of the workpieces in several locations in the installation so that the electronics can, at any moment, know the position of the workpieces in the production path.

In a particular embodiment, each encoder block has three outputs. The first delivers an index signal with each revolution of the respective carousel. The second delivers 180 pulses for each position of the carousel, counting forward. The third does the same as the second but counting backward.

In addition, associated with each of the units is a first-level (Level I) logic element. For example, the feed unit MA is associated with a level I logic element 511 and the working unit MT is associated with a level I logic element 513. Similarly, FIG. 11 shows how all the calibration operations are controlled by a unit 600 interacting with the inspecting unit MC. The unit 600 reports the operations that it does directly to the level I logic block 513 connected to the inspecting unit MC.

The different blocks 510 to 513 interact through 8-bit parallel connections with a second-level (Level II) logic element 520. This is preferably associated with an asynchronous command station 521 of the installation, which is described in detail herein.

The level II logic element 520 is optionally associated with a third-level (Level III) logic element 530 which can have the job, for example, of inspecting, not only the portion of the manufacturing installation that is described here, but also the entire installation dealing with the same product. To this end it is connected to other logic elements of the second level by the series asynchronous connections shown in FIG. 11. For example, assuming that the manufacturing installation described serves to cut casings, other manufacturing installations downstream can carry out subsequent operations of continuous stamping as well as of compressing and reducing to desired caliber. This level III logic element 530 thus generally oversees operations which are not described in detail as they fall outside the scope of the invention.

Figure 6:
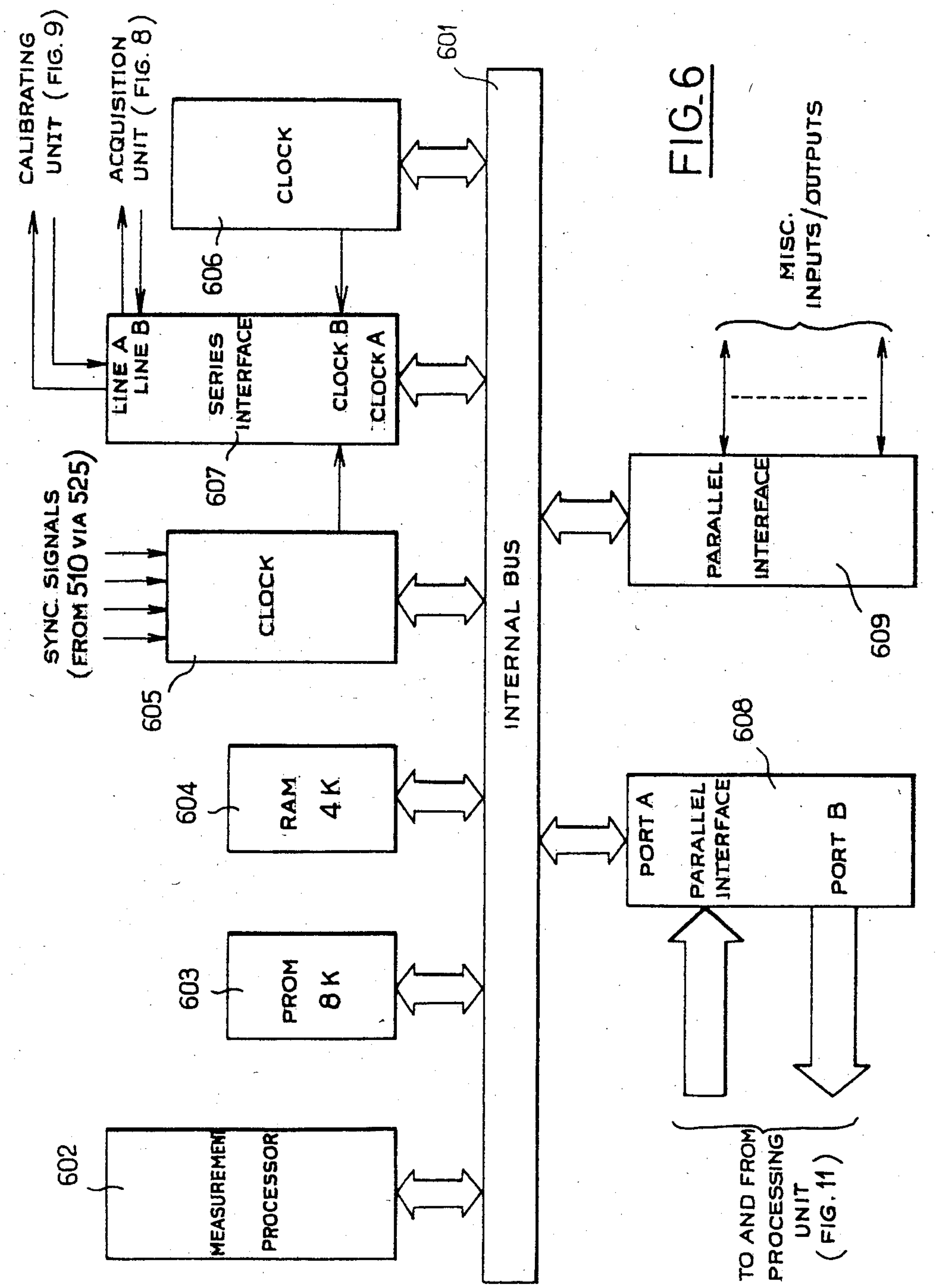
FIG. 6 is a more detailed schematic diagram of a detail of FIG. 5.

Returning to FIG. 5, the processing unit 500 is connected, generally by its level I unit 513, with the unit 600 shown in more detail in FIG. 6. This unit 600 forms a logical level Ø logic unit. The unit 600 is connected by asynchronous lines with a measurement-acquisition unit 800 described in more detail with reference to FIG. 8. Synchronization signals are similarly transmittted by the level Ø unit 600 to the acquisition unit 800 which also receives analog inputs of measurement signals (for example five analog inputs for five sensors with at least five sizes to measure, although the same sensor could make different measurements).

Finally the level Ø unit 600 is connected, also by asynchronous lines, to a calibrating unit 900 which controls the calibration and associated operations. The unit 900 is connected by the bus 901 to the calibration control board and display unit 950. The units 900 and 950 are illustrated in more detail in FIG. 9.

Detailed Description of the Unit 600 (level Ø)

FIG. 6 shows in detail the structure of the level Ø unit 600. It comprises an internal bus 601 to which is connected a measurement processor 602 as well as memories 603 and 604. The memory 603 is programmably read-only memory of 8 kilobytes, for example, whereas the memory 604 is a 4-kilobyte random-access memory.

The bus 601 is also connected to a parallel interface 608 having a port A and a port B respectively dealing with data arriving from and going out to the exploitation system or processing unit 500.

Another parallel interface 609 is optionally provided for 16 input/outputs usable for functions definable by the user.

Above and to the right in FIG. 6 there are also provided a series interface 607 as well as two counters or clocks 605 and 606. The series interface 607 communicates with the bus 601 and has two sets of outputs, respectively, line A which goes to the calibration unit of FIG. 9 and line B which goes to the acquisition unit of FIG. 8. The clock for the line A is defined by the counter 605 which receives synchronization signals coming from the encoder 510. The clock for the line B is defined by the real-time counter 606 which is only connected to the series interface 607.

Thus the level ∅ unit 600 of FIG. 6 can receive all the raw measuring information coming from the acquisition unit 800 as well as interact with the calibration unit 900 and the attached calibration-command unit 950. This unit 600 of FIG. 6 thus sets up the calibration and then processes the real values made on the products in process of manufacture.

Figure 11:
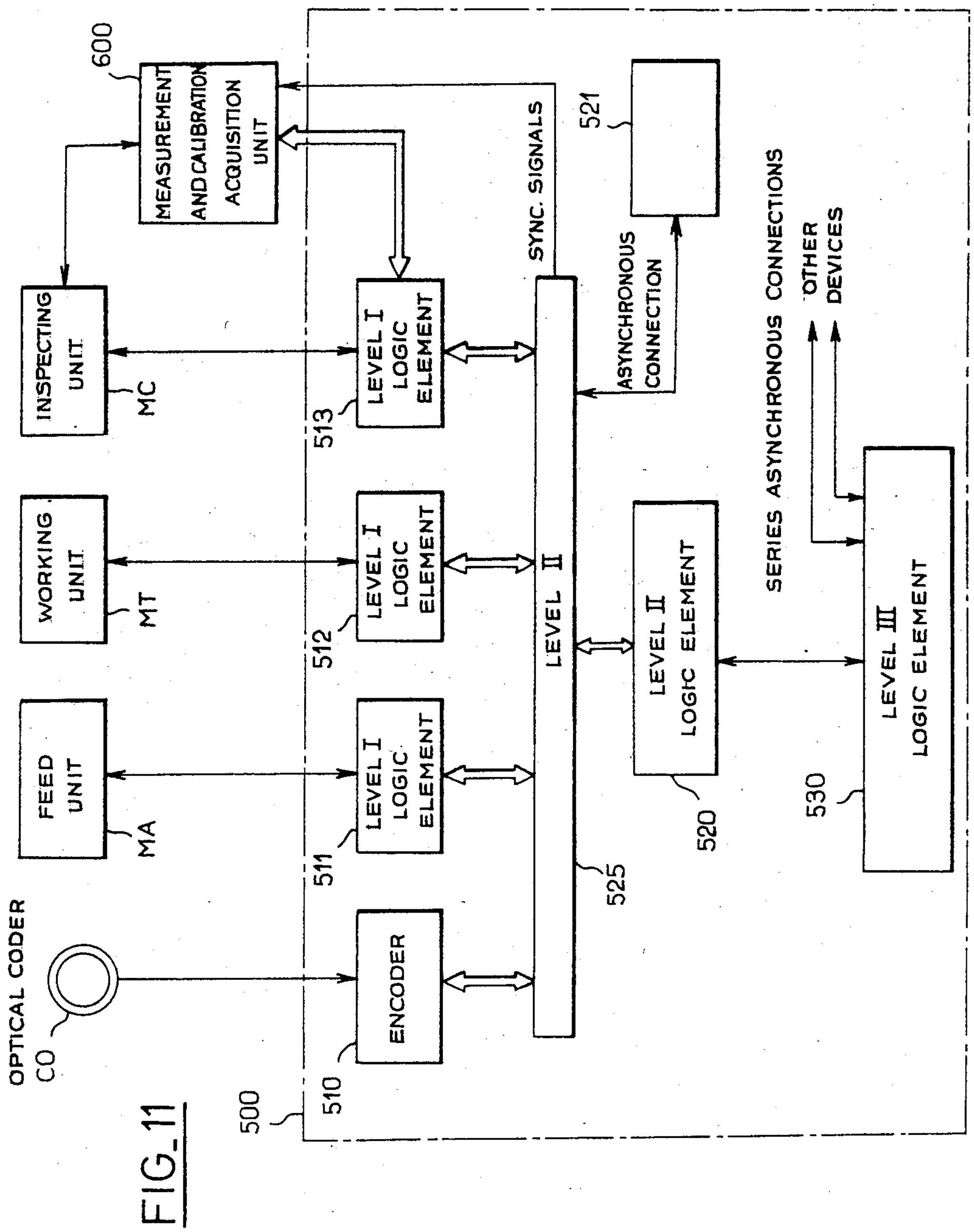
FIG. 11 represents the general scheme of the logic system of use.

The parallel interface 608 allows two-way communication between the unit 600 of FIG. 6 and the unit 500 of FIGS. 5 and 11 so that the unit 500 rejects those workpieces which do not fall within the acceptable range, this by means of the level I logic element 513 which is directly connected to the unit 600.

Acquisition Unit 800

Figure 7:
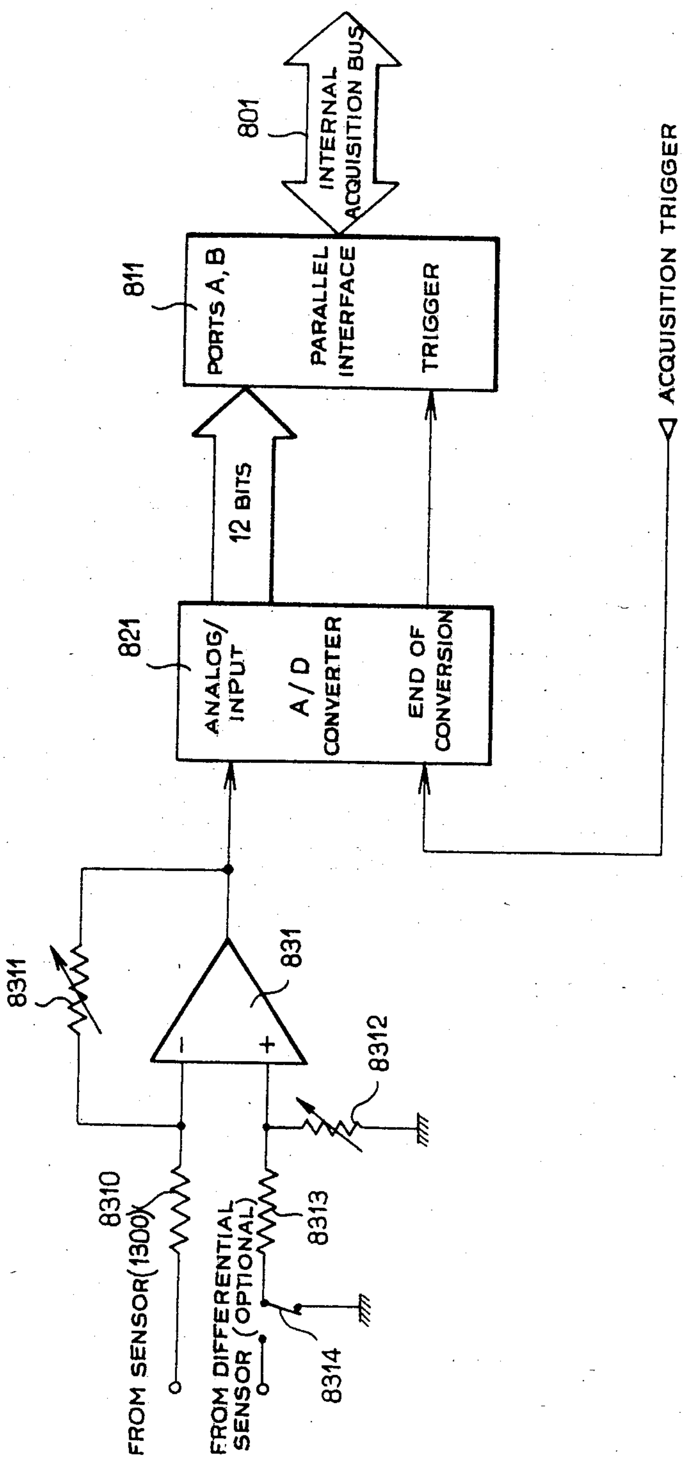
FIGS. 7 and 8 are detailed schematic views of further details of FIG. 5.
Figure 8:
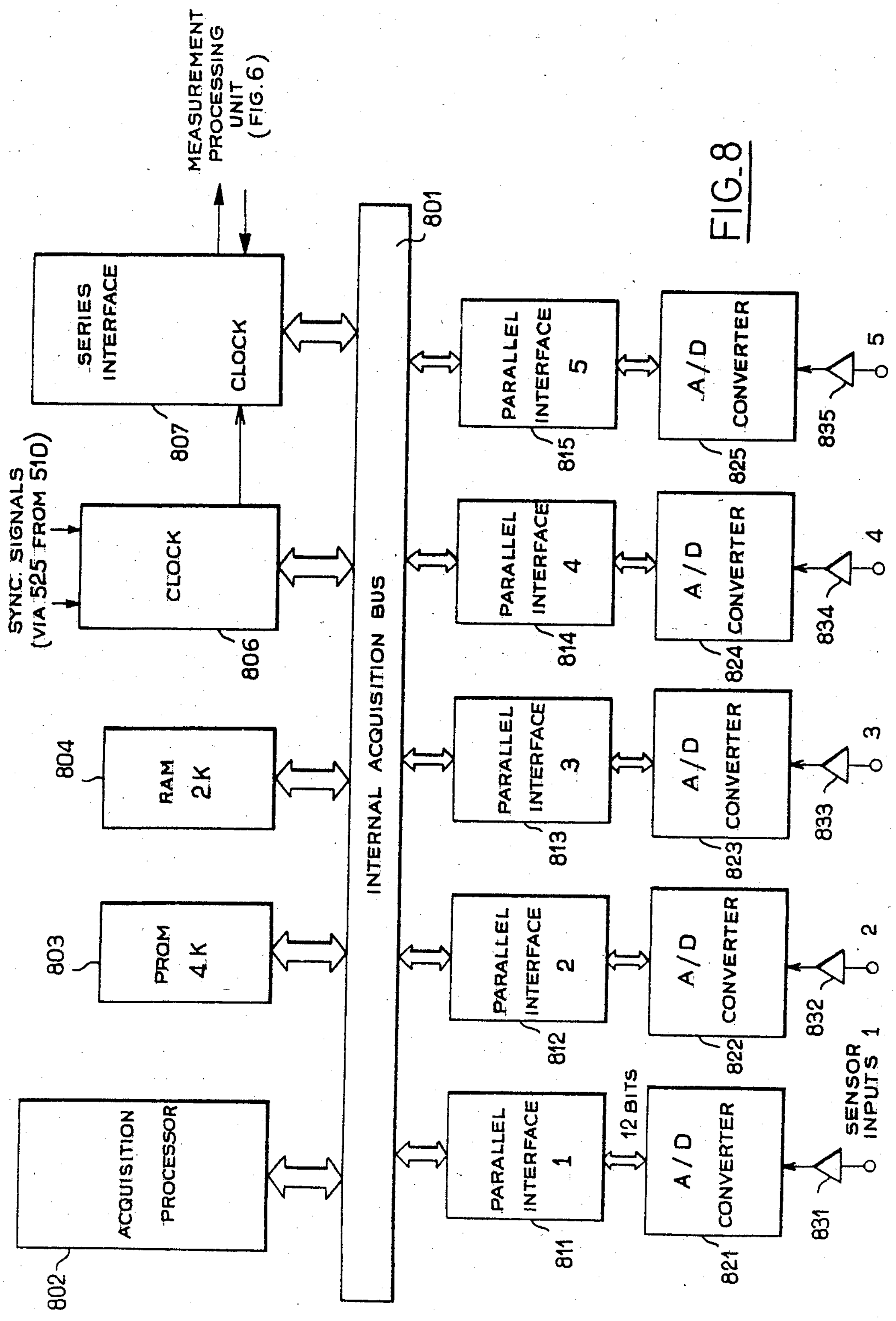

FIGS. 7 and 8 show the acquisition of the information at the sensors.

In FIG. 7 at the top, a line coming from the sensor 1300, or more correctly the signal conditioner that is connected to it, leads through a resistor 8310 at the inverting input of a differential amplifier 831. This inverting input is also connected to the output via an adjustable resistor 8311.

The noninverting input of the same amplifier 831 is connected on one side to ground via an adjustable resistor 8312 and on the other side to a resistor 8313 which goes to a switch 8314.

When a measurement only involves a single sensor, the switch 8314 is in the illustrated position, connecting the noninverting input of the amplifier 831 to ground. When, on the other hand, a measurement takes two differentially working sensors, the second sensor is then connected to the input shown at the lower left in FIG. 7, and the switch 8314 is in the other position.

In both cases, the measurement information of the sensors is at the output of the amplifier 831. This information is conducted to the analog input of an analog/digital converter 821 which receives the order to start acquisition from an acquisition processor 802 via an internal bus 801 (not shown in FIG. 8). When the sampling is converted into digital form, the end of the conversion is signaled to a parallel interface 811 by the output at the lower right corner of the converter 821. The interface 811 thus gets the 12 bits of the conversion on the parallel outputs of the converter 821 to transmit them via the acquisition bus 801 (raw measurement data in internal units).

This arrangement is shown generally in FIG. 8 for five sensors. It is noted that these five sensors can make more than five measurements by each cooperating with several targets at the same measurement station, making the measurements in a rapid sequence. This is particularly advantageous, in particular in view of the place taken by the support of each sensor (FIG. 4).

There are five differential amplifiers 831–835 for the five sensors, followed by five analog-to-digital converters 821–825, then five parallel interfaces 811–815. All the parallel interfaces communicate with the internal acquisition bus 801.

The acquisition processor 802 is seen at the top of FIG. 8. It is associated with two memories 803 and 804, the former being a programmable read-only memory of 4 kilobytes and the latter a random-access memory of 2 kilobytes. The internal memory-acquisition bus 801 is also connected to a counter or clock 806 which receives synchronization signals from the encoder device 510. This clock 806 creates clock signals for the series interface 807 which can transmit the measurement values to the unit 600 of FIG. 6.

Thus all the measurement-acquisition operations are done by the elements illustrated in FIG. 8.

Calibrating Unit 900 and Control Board 950

Figure 9:
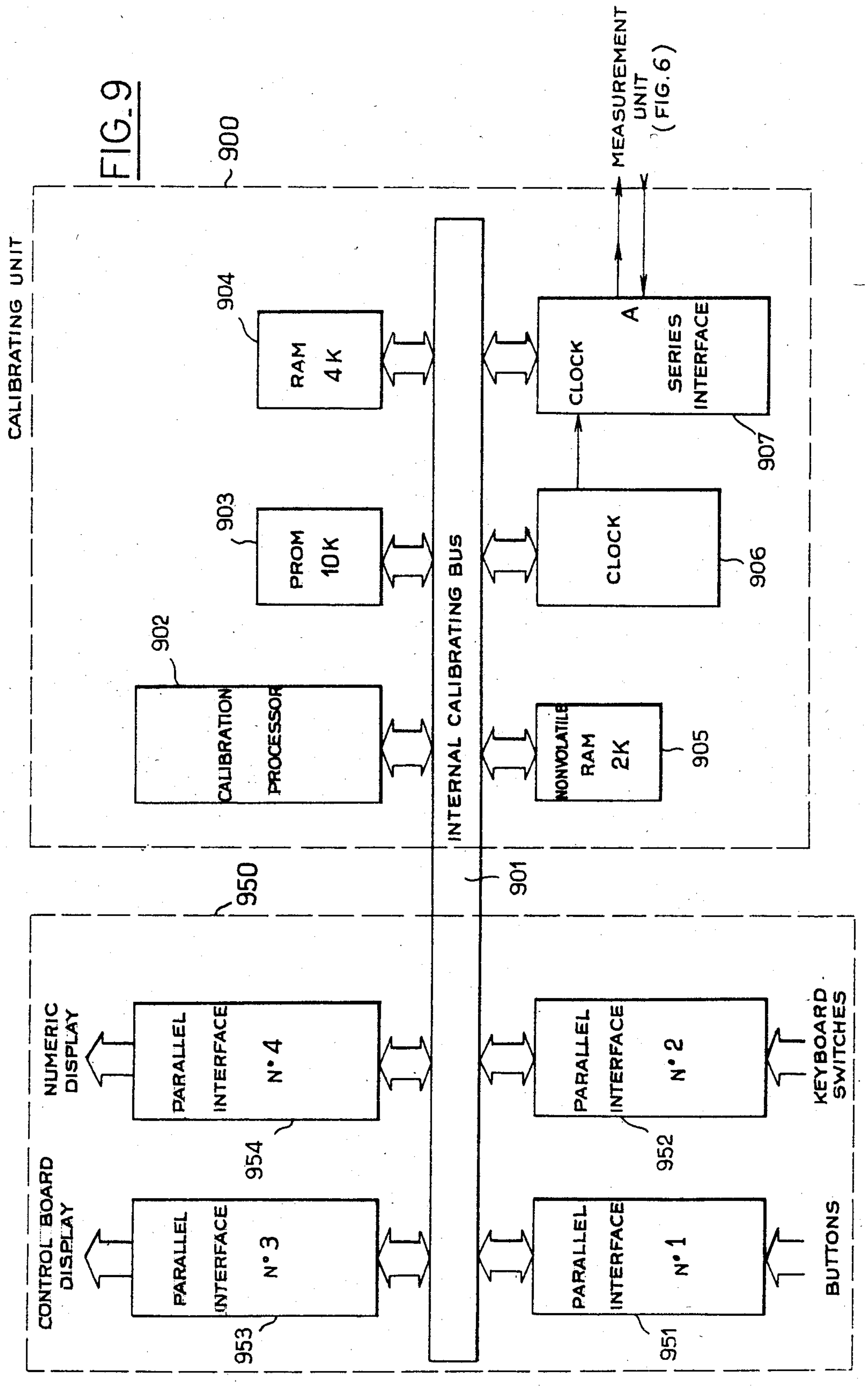
FIG. 9 is a detailed schematic view of other details of FIG. 5.

FIG. 9 shows the two calibrating units formed by a central unit and a control board.

The internal calibration bus 901 is connected (toward the right in the unit 900) to a calibration processor 902 having three memories 903, 904, and 905. The memory 903 is a programmable read-only memory of 10 kilobytes. The memory 904 is a random-access memory of 4 kilobytes. Finally the memory 905 is a nonvolatile random-access memory of 2 kilobytes, that is, it retains its data even when the machine is shut down. This memory 905 is useful for storing the calibration limits even when the system is out of service.

The internal bus 901 is connected (to the right) to a clock 906 which emits clock pulses for a series interface 907 which is connected between the internal calibration bus 901 and the measurement unit 600 of FIG. 6.

To the left in FIG. 9, the connections with the control board comprise four parallel interfaces 951–954 which respectively form connections with the elements of the control board.

Figure 10:
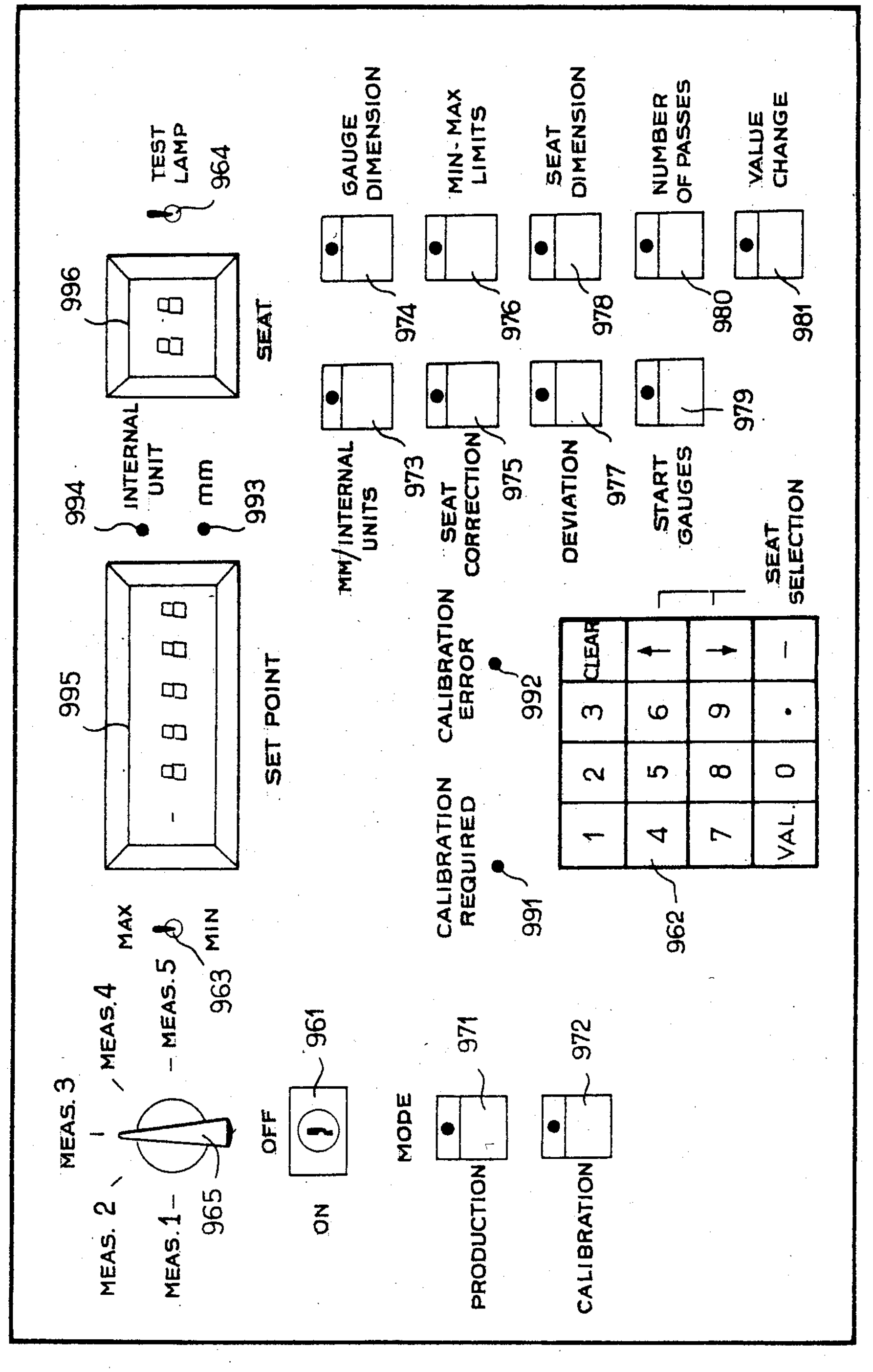
FIG. 10 is a front view of a detail of FIG. 5, in this case the control board for the system.

Before examining these connections, reference will be made to the control panel shown in FIG. 10.

This panel has buttons 971 to 978 depressible to display certain information about the state of operation of the installation as described in more detail below. Each button has a lamp which indicates if the respective condition is met or not. All these buttons are controlled by means of the parallel interface 951.

The control board 950 also has a keypad as well as switches 961, 963, 964, and 965. The keypad and these switches are connected to the parallel interface 952 of FIG. 9.

The indicator diodes associate with the buttons as well as the other diodes 991–994 and are controlled by means of the parallel interface 953 of FIG. 9.

Finally the control board has a display 995 for the measurements to be displayed as well as a smaller display 996 that indicates the number of the seat whose measurements are being displayed. These two numeric displays are controlled by means of the parallel interface 954 of FIG. 9.

Control of the Board 950

As indicated above, two modes of operation are possible: production (button 971) and calibration (button 972). The key switch 961 is for calibration. When off, califbration and any modification of the values set therein is impossible. When on, it allows calibration. If, during a caibration, the key switch 961 is returned to the off position, the calibration operation is stopped instantly.

The rotary measurement selector 965 selects the dimension to be measured from among those provided, here a maximum of five. This selector 965 is associated with the buttons 979 (gage-piece start), 976 (max/min limit), 978 (seat measurement), 977 (drift), 975 (seat correction), and 974 (gage-piece measurement).

Which data is displayed, is controlled by the switch 963 which allows either minimum or maximum values to be displayed, as well as by a button 981 which allows modification of the value.

Table I given below illustrates at "YES" the permissible combined actions and at "NO" the impermissible combinations of different buttons, both during calibration and production:

TABLE I

| KEY | Sw. 961 on Value chg. | Calibration | Production |
|---|---|---|---|
| 980 Number of passes | YES | YES | YES (N/A) |
| 979 Gauge start | NO | YES in int. units | YES |
| 978 Measure seat | NO | YES in int. units | YES |
| 977 Min/Max drift | NO | NO | YES |
| 976 Min/Max rejects | YES (mm) | YES (mm) | YES |
| 975 Correct seat | YES (mm or int. unit) | NO | YES |
| 974 Gauge measurement | YES (mm) | YES (mm) | YES |

The following is the use of the other keys. The key 973 serves for conversion between millimeters and the internal units, that is the raw digital values obtained by conversion of the output voltages of the sensor conditioners. In production this switch has no function, since it is associated with the adjustment controls (not shown and serving for maintenance).

The value-change key 981 allows one to start entering a new value on the keypad 962. The clear key CL erases the last number entered. The validation key VAL of the keypad is pressed to enter the number from the electronic circuits, in which case the clear key does not work.

The seat-selection keys bearing upright arrows of the pad 962 allow the seat number to be increased or decreased, working with the display keys illustrated in Table I above.

The switch 963 works with the keys 974 (gage dimension), 976 (max/min limit), 979 (gage start), and 977 (drift).

Finally, the switch 964 allows one to light all the diodes of the control board. If one does not light, the operator can replace it. The key bearing the negative sign is used to modify corrections.

Description of the Operation of the Installation

Below is given more detail the functioning of the elements of the installation according to the instant invention, referring to the program flow charts of the drawings.

To start with in the following, the units 900 and 950 of FIG. 5 are noted as for calibration. The unit 800 is for acquisition. The measurement processing unit 600 is noted "Level Ø". Finally the elements 510 to 513 are referenced generally "level I." In practice the reference to level I concerns mainly the element 513 of the inspecting unit MC.

In addition the measurements of the targets corresponding to workpiece sizes, as shown in FIG. 4, constitute data sets 1–5. (The numbers 1–5 indicate that up to five different measurements can be made for each workpiece and each seat of the inspecting unit). The measurements taken of the fixed targets are data sets 6 and 7. These date sets correspond to the variations with time of the dimensions of the inspecting carousel.

Measurement Acquisition Unit

Figure 8A:
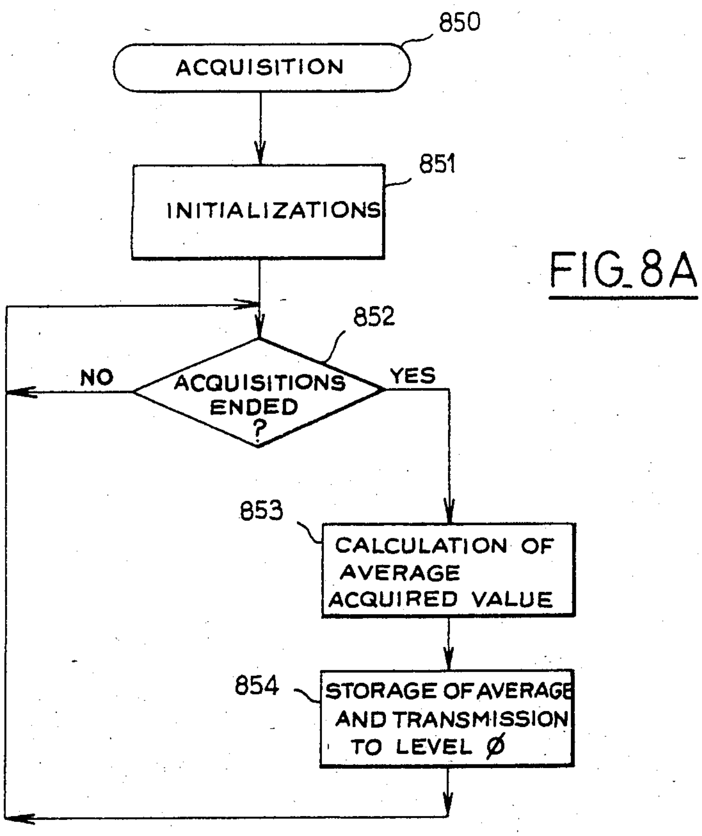
FIGS. 8A–8B are diagrams illustrating operation of the detail of FIG. 8.
Figure 8B:
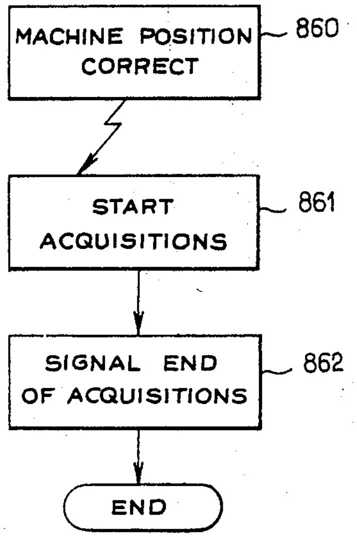

FIGS. 8A and 8B illustrate the acquisition of the measurements. In FIG. 8A the flow chart for acquisition starts at stage 850 which is followed by the initialization operation of stage 851. A decision or inquiry stage 852 then determines if the measurement acquisitions are finished, hence the loop at this stage 852.

The measurement acquisition is carried out with interruptions, in the standard manner for microprocessors. This interruption is shown in FIG. 8B. The starting point of the interruption is a stage 860 which indicates that the position of the machine is correct for the acquisition of measurements. In practice, as seen in FIG. 4, this means that the measuring location or station at MC13 is across from either a target of the inspecting carousel holding a gage piece or workpieces or a fixed target on the inspecting carousel.

The stage 861 of the interruption triggers, in rapid succession, a predetermined number of measurments of the same dimension (by one of the five sensors of FIG. 8). The stage 862 determines that these acquisitions are finished and terminates the interruption.

FIG. 8A shows that the output of the test stage 852 is then YES.

The stage 853 calculates the average value of the measurements that have been made. Finally the stage 854 stores this average (memory 804) while transmitting it to the level Ø unit 600.

Then the test stage 852 is returned to in order to do another set of measurements (either for the following sensor or for the following seat of the inspecting carousel).

All this acquired measurement data, whether for calibration or for production, are transmitted directly to level Ø which in turn passes them on, in particular, toward the calibration unit 900. This latter is described now with reference to the program flow chart of FIG. 9A.

Calibration Unit

The first stage 910 starts this flow chart and is followed by an initialization stage 911. The stage 911 displays the number of passes by means of the control board 950. This number of passes (or of traversals) of the gage piece is defined with the aid of the button 980 and of the keypad 962, the switch 961 being in the ON position. Lacking a definition of the number of passes by the user, the calibration unit will assign a default value of 20.

The general description of the invention given above does not speak of several passes of the gage pieces around the inspecting carousel. A single such pass would be enough to get information useful for calibration. Nonetheless, it has surprisingly been discovered that it is substantially more effective to make a number of passes and to average the different measurements obtained. The number of passes here is the number of times each gage piece moves through each seat of the inspecting carousel.

The number of passes defined is displayed at 995 by the stage 911.

Further on, the diagram has a decision or inquiry stage 912 which examines if the calibration data sets are in the protected memory (memory 905). If they are not there, the stage 913 will stop production and illuminate the lamp 991, forcing the user to calibrate the installation.

On the other hand, if the calibration data sets are available and complete, the stage 914 permits production, or switchover into production mode, and the stage 915 sends the calibration data sets (recovered from memory 905) to the abovementioned level Ø.

After this, the stage 916 examines if the control board 950 is being operated by the user, and displays the requested information. In particular, the user can select production mode (button 971) or calibration mode (button 972).

Then the decision stage 917 determines whether the user has selected the production mode. if yes, the stage 918 determines if this production mode is permitted. If yes, the stage 920 enables the display 995 of the control board 950 and informs level Ø of this switch to production mode. Thereafter the electronic calibration arrangement receives data from level Ø. Once such data are received (in production mode), the stage 922 calculates the drifts and the coefficients and transmits them to level Ø. These calculations are described below.

After the stage 922 is the decision stage 923, inquiring whether the user wants to calibrate the machine (key or button 972 and key switch 961 on). If there is no such command, stage 916 is returned to, making a loop around stages 920 and 922.

If production is requested (decision stage 917) but is not authorized (decision stage 918), the stage 919 displays an error signal (illumination of lamp 992). Thence one passes to the decision stage 923. This makes a loop until the operator requests calibration.

Finally if the output of the decision stage 917 is NO, one goes directly to the stage 923 to determine whether the user has requested calibration. A loop is made by the stage 916 and the decision stages 917 and 923 as long as the user does not request calibration or production.

When calibration is requested, the UES output of the decision stage 923 opens up a new decision stage 924 that extinguishes the LED lamp 991 and determines if this constitutes a mode change. If yes, the stage 925 informs level Ø of this change. Thence the relative measurements of the calibration are taken (Done by the acquisition unit passing through level Ø to get to the calibration unit). As long as the decision stage 927 indicates that the calibration measurements are not all received, one returns in a loop by the stage 916 and the stage 926 (NO output).

When all the measurements for calibration are complete, the stage 929 stores them in the memory 904. Stage 916 is returned to.

In this case the YES output of the decision stage 926 is enabled (end of all passes of the calibration). In a manner described below, the stage 928 calculates the data sets of the calibration and puts them in the nonvolatile memory 905. Finally the stage 930 authorizes switchover to production. Stage 916 is returned to.

User Interventions

Obviously, the transitions between calibration and production mode presuppose certain interventions on behalf of the operator. To pass into calibration mode the operator should:

1. Position the deflectors for the gage pieces so they can pass around the recycling loop defined by the wheels MC15 to MC17 (FIG. 3), and manually place the gage pieces in the seats of the recycling loop one behind the other no matter where but in the order of the measurements to be made. Assuming five measurements, the gage pieces are inserted in pairs, that is first the low-limit gage piece and the upper-limit gage piece defining the first measurement range, then the low- and upper-limit gage pieces for the second range, and son on to the fifth range or measurement. Each pair of gage pieces is accurately machined at least on the surface critical to the measurements being made. For example, for cutting cartridge casings to length, the two gage pieces of each pair are very finely machined on their end faces. If the second measurement consists, for example of a diameter measurement, the cylindrical surface machining of the gage piece would be important.

2. Enter the dimensions of the gage pieces at the control board 950 of FIG. 10. To do this, the user first selects the measurement desired by means of the switch 965, then depresses the button 974, moves switch 963 to MIN, depresses the value-change button 981, and enters, at the keypad 962, the numerical data for the low-limit gage piece at hand. The procedure is the same for the maximum value, of course after having moved the switch 963 to MAN. This procedure is repeated for each measurement with each of the gage pieces introduced into the machine.

3. Similarly the user or operator can enter the reject limits in millimeters, that is the dimensions above and below which pieces are not acceptable in production. The procedure is the same as for the gage-piece dimensions, except that the button 976 rather than the button 974 is depressed.

4. For a complete calibration, the user presses the button 972 and starts the machine. During the calibration operation the machine displays the number of passes that are left to be done. Then it can display on demand the upper and lower dimension limits. After calibration, it is possible to display the measurements for the targets in millimeters since the conversion coefficient is known, that is they are an integral part of the calibration carousel. To this end one depresses button 979 and selects the type of measurement desired by means of the switch 965.

In production, no operations are normally needed at the control board 950.

Nonetheless the following can be displayed:
the initial measurements for the fixed targets,
the gage-piece dimensions,
the reject dimensions,
the correction values,
drift, and
dimensions of the inspecting-unit seats.

As seen below corrections are effected seat-by-seat on the measurements. A display of these corrections can be obtained by pushing button 975 and operating the switch 965 to indicate the desired measurement. The desired seat is obtained by operating the up and down seat-selection keys of the keypad 962.

After a calibration, it remains possible at any moment to modify the correction values used by the electronic circuit, by moving the key switch 961 to ON, selecting the measurement desired by the switch 965, depressing the value-change button 981, and entering the new correction at the keypad 962 in millimeters, and pressing the enter key VAL of the keypad 962.

The dimensions of the seats of the inspecting unit are displayed by pushing the button 978, even if there is no cartridge in the seat defined by the operator.

The drift is the difference between the measurements made at the start (during the last calibration) of the targets fixed on the carousel and the measurements subsequently made of these fixed targets. To see this difference, the selected measurement is set at the switch 965 and the minimum or maximum target with the toggle 963. Then the drift button 977 is depressed.

As mentioned above, the calculations made by the calibration unit are to be described. These calculations are different depending on whether one is in calibration or production mode.

Calibration Unit in Calibration Mode

Figure 9A:
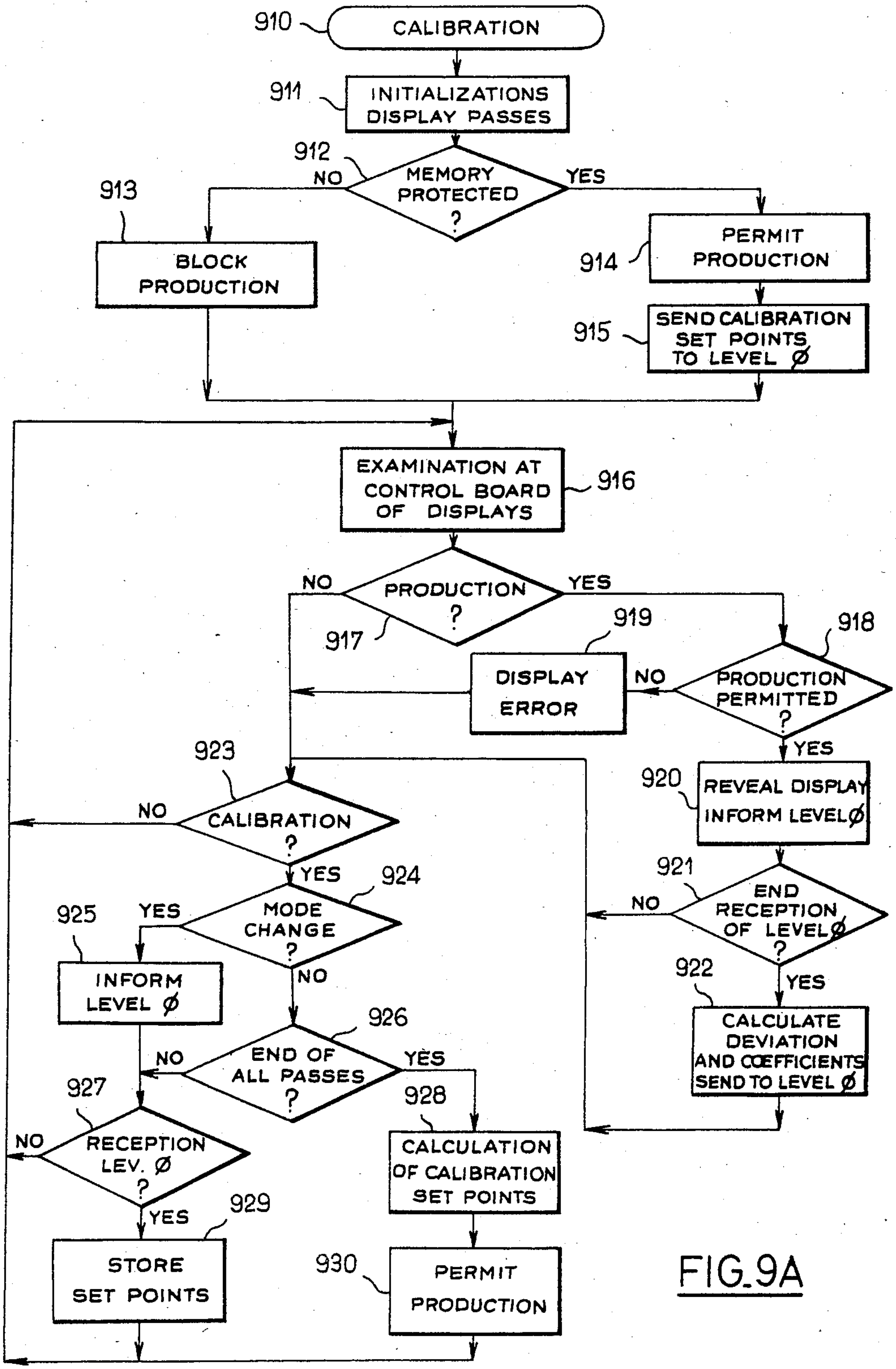
FIG. 9A is a diagram illustrating operation of the detail of FIG. 9.

In calibration mode the calculations are those done by stage 928 of FIG. 9A.

Reference i is assigned to the seats of the inspecting carousel, there being eight such seats. Reference j is assigned to the different measurements, of which there are five.

The following pertains:

VijM=measurement j at seat i for the maximum gage piece,

Vijm=measurement j at seat i for the minimum gage piece,

EjM=measurement j at seat i for the maximum fixed target,

Ejm=measurement j at seat i for the minimum fixed target.

The calibration unit calculates the minimum and maximum averages for each of the calibrated casings as follows:

BjM (upper-limit gage piece average)$=_i$VijM/8, and

Bjm (lower-limit gage piece average)$=_i$Vijm/8.

This allows one to adjust all the values relative to these averages to correct for the seats:

$$Cijm=VijM-Bjm$$

$$Cijm=Vijm-Bjm,$$

whence the average correction by seat $$Cij=(CijM+Cijm)/2.$$

Even for the fixed targets there are the following corrections:

$$CcjM=EjM-BjM$$

$$Ccjm=Ejm=Bjm.$$

The calibration unit thus has the following corrected values:

for the inspecting seats $$Vcij=Vij=Cij,$$

and for the fixed targets $$EcjM=EjM-CcjM,$$

$$Ecjm=Ejm=Ccjm.$$

In addition, the Foucault-current sensors mentioned above are presumed to have a linear response, so that, by means of a maximum or upper-limit gage piece and a minimum or lower-limit gage piece, this response curve can be accurately determined.

In addition:

XjM and Xjm are, respectively, the maximum and minimum values in microns of corresponding calibrated pieces, BjM and Bjm are, respectively, the average for the minimum and maximum values in internal units. Thus it is possible to derive the characteristics of the linear response of the Foucault-current sensors, that is, the slope aj and the ordinate at the origin bj, which expressed by the following relationships:

$$aj=(XjM-Xjm)/(BjM-Bjm), \text{ and}$$

$$bj=XjM-ajBjM.$$

Thus, for a given value on the right, the following linear relationship exists:

$$Xj=ajVj+bi,$$

wherein

Xj=value of the measurements in microns, and

Vj=value of the measurements in internal units.

Since it is the level Ø that itself does the correction and the conversion of the data sets before transmitting them to the other logic units of higher levels, the calibration unit itself should have the necessary means for doing for these calculations. Thus in order to calibrate, the following values are sent to the level Ø:

Conversion coefficients—aj and bj,

Seat corrections in internal units—Cij,

Corrections of the fixed targets in internal units—Ccj,

Target pieces in the machine in internal units,

Reject thresholds in microns, and

Dimensions of fixed targets in microns.

Similarly, all these values are stored in the nonvolatile memory 905 of FIG. 9. They thus permit immediate production when the machine is turned on without having to calibrate it, as long as the stored data are read on startup of production. This has already been described generally with reference to FIG. 9A, in particular stages 912 and 915 of same.

Calibration unit in Production Mode

Below is described the calculations that are made by the calibration unit when in the production mode, being done by stage 922 of FIG. 9A.

After reception from level Ø of the five measurements and the dimensions of the fixed targets, these data sets are treated so as to be able to transmit back to level Ø the conversion coefficients and the calibration data sets.

From reception, the data set of the five measurements is corrected by means of the correction factors Cig and then converted into microns with the coefficients aj and bj. In addition the data sets of the target gage pieces started are corrected (correction Ccj) and converted into microns (coefficients aj and bj) by the calibration unit.

To calculate the drift, two values of importance are used: the initial measurements of the field targets and the current measurements of these targets.

The initial measurements for the target pieces are the values calculated during the preceding calibration. They correspond to the starting values of the corrected fixed targets.

The current measurements of the fixed targets are the sliding averages of the measurements, both maximum and minimum, that are made. These sliding averages are done on the sixteen last measurements by the level Ø and represent the mechanical deviation of the unit.

The minimum drift is equal to the dimension of the present minimum fixed target (sliding average) and the dimension of the minimum fixed target first measured during the preceding calibration. The maximum drift is equal to the difference between the dimension of the present maximum fixed target (sliding average) and the dimension of the maximum fixed target first measured during the preceding calibration.

In addition, the dimensions of the current fixed targets, in a sliding average, serve as the basis of the calculation and derivation of the conversion coefficients aj and bj at each rotation of the inspecting carousel. Thus, the values of the dimension on microns are accurate due to allowing for the drift of the unit, It is these coefficients aj and bj, that are reformed, that are sent to the level Ø at each rotation of the carousel so as to allow it to correct calculations.

Knowing now the detail of the operations done in the calibration unit and in the aquisition unit the flow chart illustrated in FIGS. 6A to 6D will be described.

Electronic Elements of level Ø

Figure 6A:
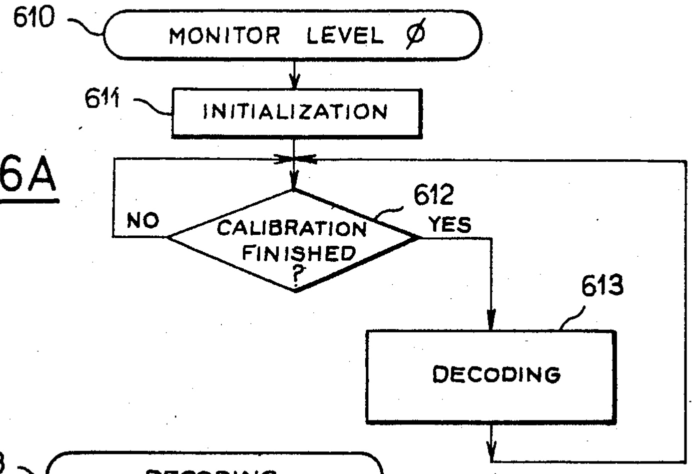
FIGS. 6A–6D are diagrams illustrating operation of the detail of FIG. 5.

The flow chart of FIG. 6A shows a monitor or main program of the level Ø unit.

The monitor stage 610 is followed by an initialization stage 611. The a simple loop is formed around the decision stage 612 which determines of the incoming information coming from the calibration unit is complete. If no, the program loops back to the decision stage 612. If yes, stage 613 decodes the function taking place, and when this is completed the system loops back upstream of the stage 612.

Figure 6B:
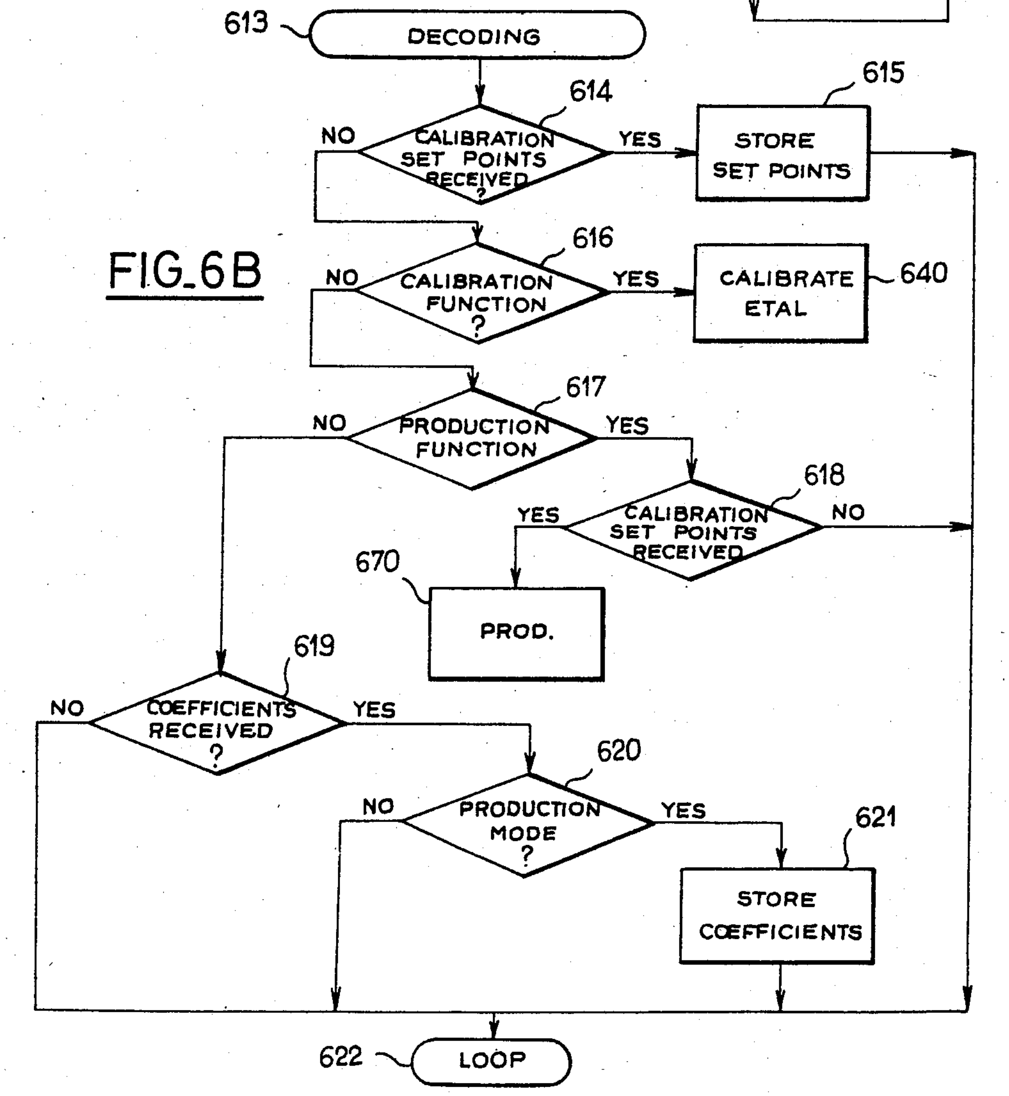

The decoding stage 613 carries out the steps as shown in FIG. 6B.

The first step is the decision stage 614 which determines if the calibration data sets (corrections coefficient) have been received from the calibration unit. If yes, the stage 615 stores these data sets in the memory 604 of level Ø and one and one goes straight to the loop stage 622 ending the subroutine. If no, the decision stage 616 determines if the calibration function is selected by the calibration unit. If yes, the stage 640 starts the calibration (see the description of FIG. 6C below).

If the calibration function is not selected, the decision stage 617 determines if the production function has been requested by the calibration unit and its control board (key 971). If yes, the stage 618 determines if the calibration data sets have been received. If so, 670 initiates production as will be described below with reference to FIG. 6D. If the calibration data sets have not been received, the loop stage 622 is next while the data sets are waited for in the next cycle.

If the production function had not been perceived at the stage 617, the decision stage 619 determines if the abovementioned coefficients (aj, bj, etc.) have been correctly received by the level Ø. If no, one loops through 622 while waiting for these coefficients. If yes, stage 620 determines if the production mode is running (which was determined during an earlier cycle). If the production mode is not running, the program goes to stage 622. If production is taking place, the stage 621 stores the coefficients for later use and then loop stage 622 is effective.

During the production the stages 614, 616, 617, and 618 are chained. Each revolution of the inspecting carousel produces new values of the coefficients aj and bj which are stored by stage 621 after going through stage 614, 615, 617, 619, and 620.

Unit 600 of Level Ø in the Calibration Mode

Figure 6C:
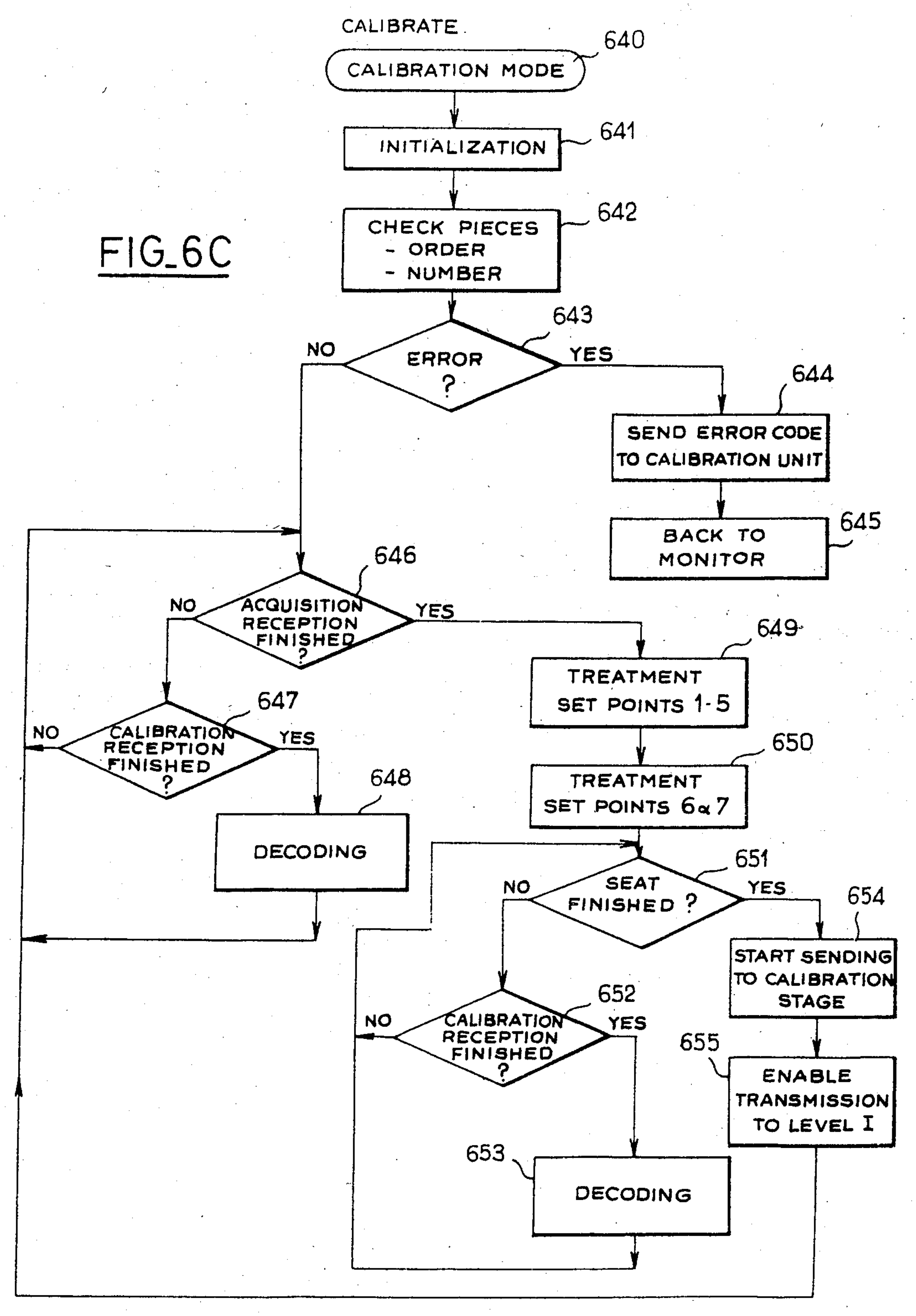
Figure 6D:
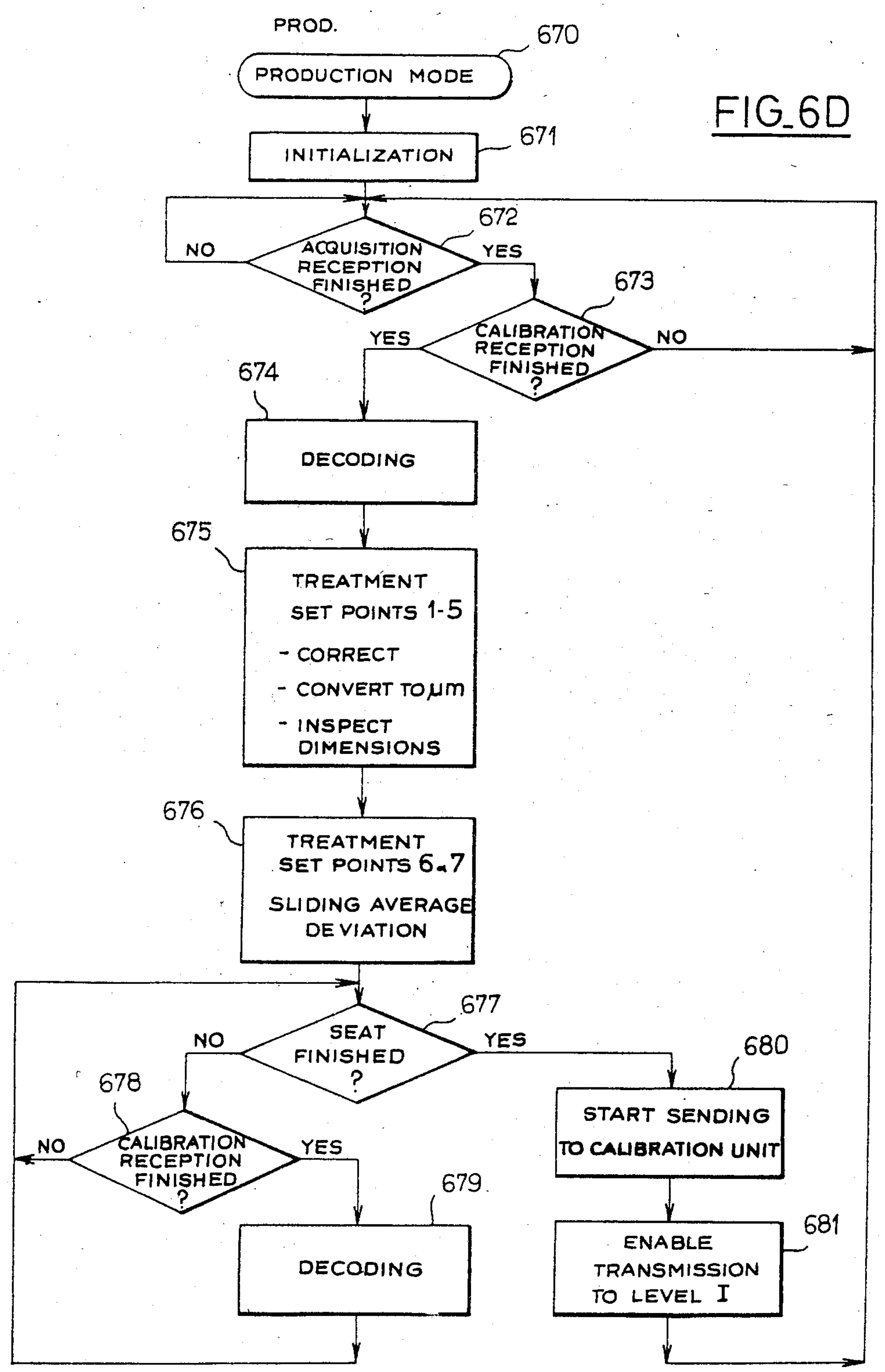

The operations of level Ø during calibration are described blow with reference to FIG. 6C.

After starting stage 640, there is an initialization stage 641. Thereafter, the checking stage 642 determines the presence of pieces and ascertains if same are in the right quantity and order. The decision stage 643 determines then if this inquiry has revealed an error. If yes, the stage 644 sends an error code to the calibration unit (lamp 9920 and loops back to the monitor stage 645 of FIG. 6A.

If there is no error, the stage 646 determines if all the measurement information from the aquisition unit 800 is received. If not, the stage 649 ascertains if all the needed information has been received from the calibration unit 900. If no, one loops back to 646. If yes, the following decoding stage 648 decodes as shown in FIG. 6B, then returns to stage 646 (unless mode changes).

If the decision stage 646 determines that the complete set of measurement data from the unit 800 has been received, the treatment operations are enabled. The stage 649 treats the data sets 1 through 5, that is those measurements relating to the targets which are effectively integral with the movable workpiece-sensing parts of each seat of the inspection carousel. Thereafter the stage 650 differently treats the data sets or actual values 6 and 7 relating to the targets fixed relative to the inspection carousel.

An indicated above, this is done seat-by-seat of the inspecting carousel. Once an examination of a seat is over, the YES output of the stage 651 initiates the sending of the measurement data to the calibration unit, via the stage 654 while enabling their transmission to level I (element 513) at stage 655. The program then loops back to the upstream stage 646.

If, on the contrary, the data available for the set under calibration are not complete, the NO output of stage 641 leads to another decision stage 652 which determines if the complete calibration data for a seat have been obtained from the calibration unit 900. If no, the system loops back to decision stage 651. If yes, the stage 653 decodes as described with reference to FIG. 6B, after which the program returns to stage 651 to see if the examination of the seat is finished (unless a mode change has been commanded at stage 653).

From the preceding, it can be seen that, while calibrating, the level Ø unit does nothing more than accurately monitor the aquisition of measurement data and their use by the calibration unit, without really intervening in the process other than the treatment operations of stages 649 and 650.

Unit 600 of Level Ø in the production Mode

Attention is now to be directed to the operation of the level Ø unit during production, with reference to FIG.

6D. After the staring and initialization 670 and 671 stages, the decision stage 672 determines if all the required measurement data for a seat have been obtained. If no, this stage 672 is looped. If yes, the following stage 673 determines if all the calibration data needed from the calibration unit have been obtained. If no, the stage 672 is looped again. If yes, the following stage 674 proceeds with decoding. Once again this is what was described with reference to FIG. 6B.

Thereafter the stage 675 gives the above-mentioned treatment of the data sets 1 to 5 defined above, correcting these data by the calibration information, converting them into microns, and checking the dimensions relative to the predetermined limits.

Now the determination is made whether a workpiece is or is not within the acceptable size range for the operation being monitored.

Thereafter the stage 676 treats the data sets 6 and 7, that is that information to the targets fixed on the inspecting carousel. The treatment of these data sets allow one to calculate the sliding average as well as the deviation of the dimensions of the moving inspecting carousel.

After these calculations the decision stage 677 determines if the seat under scrutiny has been completely examined. If no, stage 678 determines if all the information needed from the calibration unit has been received. If no, the program loops back to stage 677. If yes, decoding takes place at stage 679.

If, on the contrary, the decision stage 677 reports that the seat under scrutiny has been fully examined, the stage 680 starts sending the data from the level Ø toward the calibration unit, in order that sam can figure out the displaceable data as described above. Finally stage 681 enables transmission of the measurement information to level I of the electronic stages. Thereafter one loops back to stage 672.

In brief, the electronics of level Ø receive at each cycle or step of the machine, the result of the measurements made by the acquisition unit, here a set of five data sets in internal units which represent the various dimensions of the workpiece being inspected. In addition to these dimensions, there can be one or two others which are dimensions in internal units of the targets of the inspecting carousel. For certain positions of the machine, these values can be absent, as it is not always necessary to provide two targets for each inspection seat.

In summary, during calibration, the communications of level Ø with the calibration unit are raw data coming from the acquisition unit. In this case, the level Ø electronics can also transmit the raw data level I, but in internal units, since the corrections and the conversion coefficients mentioned above are not yet know.

During production, the level Ø serves mainly to use the synchronization signals, in particular those coming from the encoder 510 of FIG. 11, to assign to each of the five measurements made by the aquisition unit, the respective seat number and the identity of the piece in question. As far as the dimensions of the fixed targets, level Ø forms for each target a sliding average of the sixteen values (e.g.). These are five raw measurements and the uncorrected sliding averages in internal units which are then transmitted to the calibration unit.

On the other hand, on each revolution of the carousel in the production mode, the calibration unit communicates the new conversion coefficients so as to take account of the least variations and drifts of the machine.

During production, the level Ø unit thus knows the dimension converted into microns and can sort the pieces by size limits coming at the end of calibration or at the beginning of production. The accuracy of the dimensions is verified simply by comparing the two limit values. All these converted data are transmitted in microns to level I, which has an indicator which displays the result of the size checking, that is, whether the workpiece lies between the two limits, below the lower limit, or above the upper limit.

Although the decision to reject a piece in production can be made in level Ø, which is near the aquisition unit 800 and the calibration unit 900, the structure illustrated in FIG. 11 operates differently. Here there is a level I for each of the elements of the machine, that is of the inspecting means, as well as for the working unit and the feed unit. Under these conditions the data which was just indicated are used in fact by the level I unit 513 to trigger the rejection of a workpiece if necessary. This rejection can take place at the normal rejection station MC141 of FIG. 3.

The person skilled in the art will now understand that the instant invention allows one to operate a piece of machining equipment at high speed while monitoring operation very closely. This is important in many technical fields, in particular in the manufacture of small-arms ammunition casings. The operator of the machine need only intervene during calibration operations. Once this is done, production takes place normally without human intervention. The flow charts described above show clearly that, if a production problem arises, the machine can stop itself and require the operator to intervene appropriately, for instance by recalibrating.

In addition, the devices according to this invention allow constant inspection of the workpieces in production. To this end, one can verify, in particular, the operation of the inspecting unit, feeding in one or more gage pieces at the location MC110 of FIG. 3 and displaying the dimensions of these gage pieces by means of the control board 950. These gage pieces do not need to recirculate through the recycling loop, but can be removed at the special rejection station MC142.

Furthermore it is possible to pick out, at the special rejection station 142, production workpieces whose sizes have been measured by the machine, sizes which can be check measurements made manually or otherwise.

Of coarse the instant invention is not limited to the embodiment described, but it is intended to include any variations lying within the scope of the following claims.

We claim:

1. An installation for assembly-line manufacture wherein workpieces move in a row along a production path at a generally uniform spacing and comprising:

control means for supervising and coordinating the operation of subsequent means of the installation on the workpieces as same move along the production path, feed means for holding a supply of workpieces and for placing them in a predetermined position in the seats of an input rotary feed conveyor, inspecting means defining a portion of the continuous production path for the workpieces for inspecting the workpieces as they pass there along and including:

an intake rotary conveyor cooperating with the feed conveyor, an output rotary conveyor and, at least one inspecting carousel between the intake and output conveyors, calibrating means for periodically creating gaps in the production line upstream of the inspecting carousel, inserting a minimum-size gauge into one of the gaps and a maximum-size gauge into another upstream of the inspecting carousel, measuring the sizes of the gauge pieces on the inspecting carousel and, establishing from the measured sizes of the gauge pieces maximum and minimum-size limits; and rejecting means along the production path downstream of the inspecting carousel for removing from the path workpieces whose size lie outside the range of the established size limits, said feed means, calibrating means and rejecting means constituting said subsequent means of the installation, wherein the inspecting carousel and the intake and output conveyor each have a plurality of workpiece-receiving seats equispaced about a center, said calibrating means further comprising:

recycling means including a recycling conveyor connected between the intake and output conveyors for taking the gage pieces from the latter and circulating them back to the former, whereby said conveyors and inspecting carousel define a closed recycling circuit having a predetermined number of generally equispaced positions, the number of positions of the recycling circuit and the number of seats of the inspecting carousel having no common whole-number divisor other than one.

2. The installation as claimed in claim 1, characterized in that said installation further comprises, between the feed means and the inspecting carousel, working means including:

an upstream rotary conveyor receiving workpieces from the input feed conveyor;

a working carousel receiving workpieces from the upstream rotary conveyor and including means for working on the workpieces; and a downstream rotary conveyor receiving workpieces from the working carousel and passing them to the intake rotary conveyor of the inspecting means.

3. The installation as claimed in claim 1, characterized in that the inspecting means includes at least one measuring element displaceable relative to the inspecting carousel into and out of contact with the workpieces thereon and carrying a target jointly displaceable with the measuring element, and means for measuring the distance from the target to a fixed location when the measuring element is engaging a workpiece.

4. The installation as claimed in claim 1, wherein the installation further comprises means for displaying the workpiece sizes.

5. The installation as claimed in claim 1, wherein the inspecting carousel carries a target and a measuring device that includes means for measuring the distance from the target to a fixed location.

6. The installation as claimed in claim 1, wherein the installation further comprises means for displaying workpiece sizes in standard dimensions.

7. The installation as claimed in claim 1, wherein the control means has a nonvolatile memory for the limits.

8. The installation as claimed in claim 1, wherein the control unit includes, for each operating means, a respective first-level logic unit.

9. The installation as claimed in claim 8, wherein the control means includes a second-level logic unit connected to the first-level units.

* * * * *